US012738142B2

(12) United States Patent
Ozer et al.

(10) Patent No.: US 12,738,142 B2
(45) Date of Patent: Sep. 15, 2026

(54) AIR MONITORING AND AIR INSIGHT GENERATION

(71) Applicant: Turo Inc., San Francisco, CA (US)

(72) Inventors: Matt Ozer, San Francisco, CA (US); Talia DeVault, San Francisco, CA (US)

(73) Assignee: Turo Inc., San Francisco, CA (US)

( * ) Notice: Subject to any disclaimer, the term of this patent is extended or adjusted under 35 U.S.C. 154(b) by 126 days.

(21) Appl. No.: 18/104,425

(22) Filed: Feb. 1, 2023

(65) Prior Publication Data

US 2024/0257625 A1 Aug. 1, 2024

(51) Int. Cl.

*G08B 21/12* (2006.01)
*G01N 1/22* (2006.01)
*G08C 17/00* (2006.01)

(52) U.S. Cl.

CPC ............. *G08B 21/12* (2013.01); *G08C 17/00* (2013.01); *G01N 2001/2276* (2013.01)

(58) Field of Classification Search

CPC .. A61F 9/067; B01D 46/0086; F24F 11/0001; F24F 11/30; F24F 11/49; F24F 11/52; G01G 40/63; G01N 1/2273; G01N 15/06; G01N 2001/021; G01N 2001/2276; G05B 15/02; G06F 11/079; G06F 16/338; G06F 30/13; G06N 20/00; G06Q 30/0222; G08B 21/12; G08C 17/00

USPC .......................................................... 340/632

See application file for complete search history.

(56) References Cited

U.S. PATENT DOCUMENTS 8,949,022 B1 * 2/2015 Fahrner .................. G01C 21/20 340/995.19
10,222,360 B1 3/2019 Nourbakhsh et al.
2014/0031082 A1 * 1/2014 Zishaan ................. G08B 21/14 455/556.1
2016/0063833 A1 * 3/2016 Schultz .................. G08B 19/00 340/522
2016/0091474 A1 * 3/2016 Griffon .............. G01N 33/0036 702/24
2017/0091856 A1 * 3/2017 Canberk ............ G06Q 30/0609

(Continued)

FOREIGN PATENT DOCUMENTS

EP 4659016 A1 12/2025
WO 2024163773 A1 8/2024

OTHER PUBLICATIONS

PCT/US24/14049 , "International Search Report and Written Opinion", PCT Application No. PCT/US24/14049, May 2, 2024, 6 pages.

*Primary Examiner* — Stephen R Burgdorf
(74) *Attorney, Agent, or Firm* — FIG 1 Patents

(57) ABSTRACT

Techniques for air monitoring and air insight generation are described. In one implementation, an air monitoring device produces air monitoring data, such as particulate measurements, for air in an area monitored by the air monitoring device. An air monitoring application obtains the air monitoring data produced by the air monitoring device. The air monitoring application processes the air monitoring data to generate one or more air insights associated with the air in the area monitored. The one or more air insights are used by the air monitoring application to generate air insight content including the one or more air insights. The air monitoring application configures a user interface of a computing device to display the air insight content including the one or more air insights.

20 Claims, 14 Drawing Sheets

(56) References Cited

U.S. PATENT DOCUMENTS

2018/0119973 A1 5/2018 Rothman et al.
2018/0268473 A1* 9/2018 Um ........................ H04L 41/022
2019/0026796 A1* 1/2019 Dinis da Silva de Carvalho ........ G06Q 50/40
2019/0168711 A1* 6/2019 Oesterling .............. G06F 16/51
2019/0293539 A1* 9/2019 Manautou .......... G01N 33/4925
2020/0175783 A1* 6/2020 Adams ................. G07C 5/0808
2020/0378940 A1* 12/2020 Pariseau ............ G01N 33/0075
2020/0402391 A1* 12/2020 Dutta ..................... G07C 5/008
2021/0033586 A1* 2/2021 Chadha .............. G01N 33/0065
2021/0372650 A1* 12/2021 Hyde ....................... F24F 11/39
2024/0096204 A1* 3/2024 Katz .................... G08B 29/043

* cited by examiner

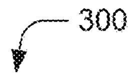
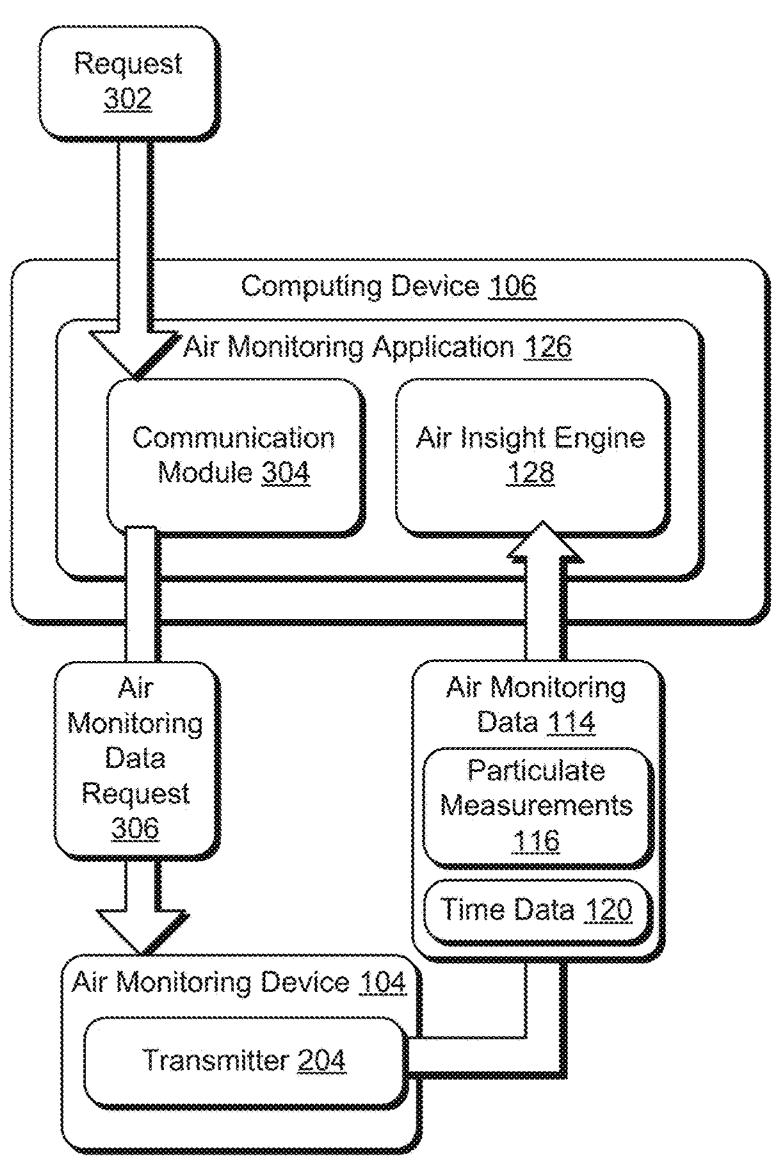
FIG. 3

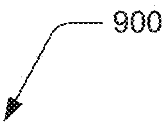
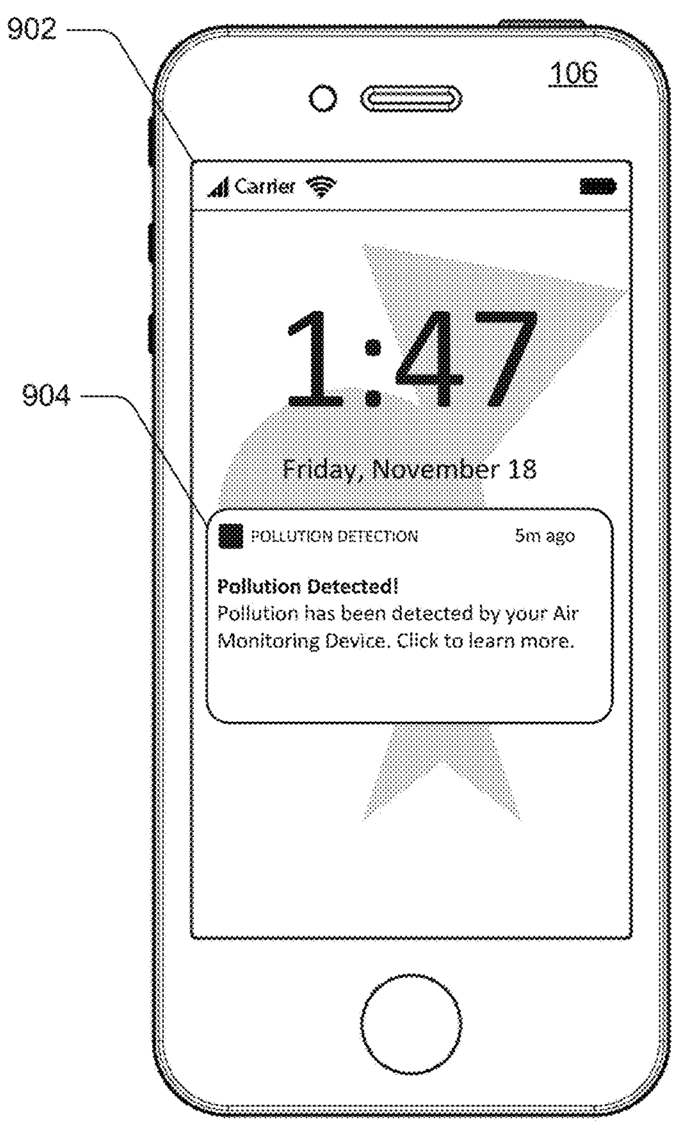
FIG. 9

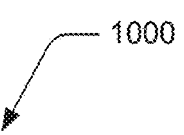
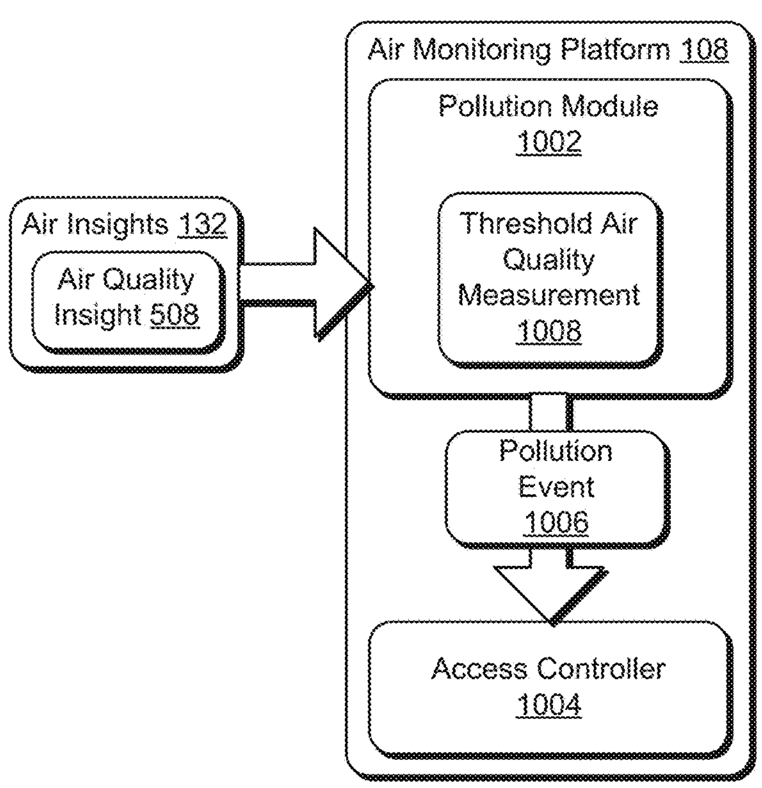
FIG. 10

Figure 11:
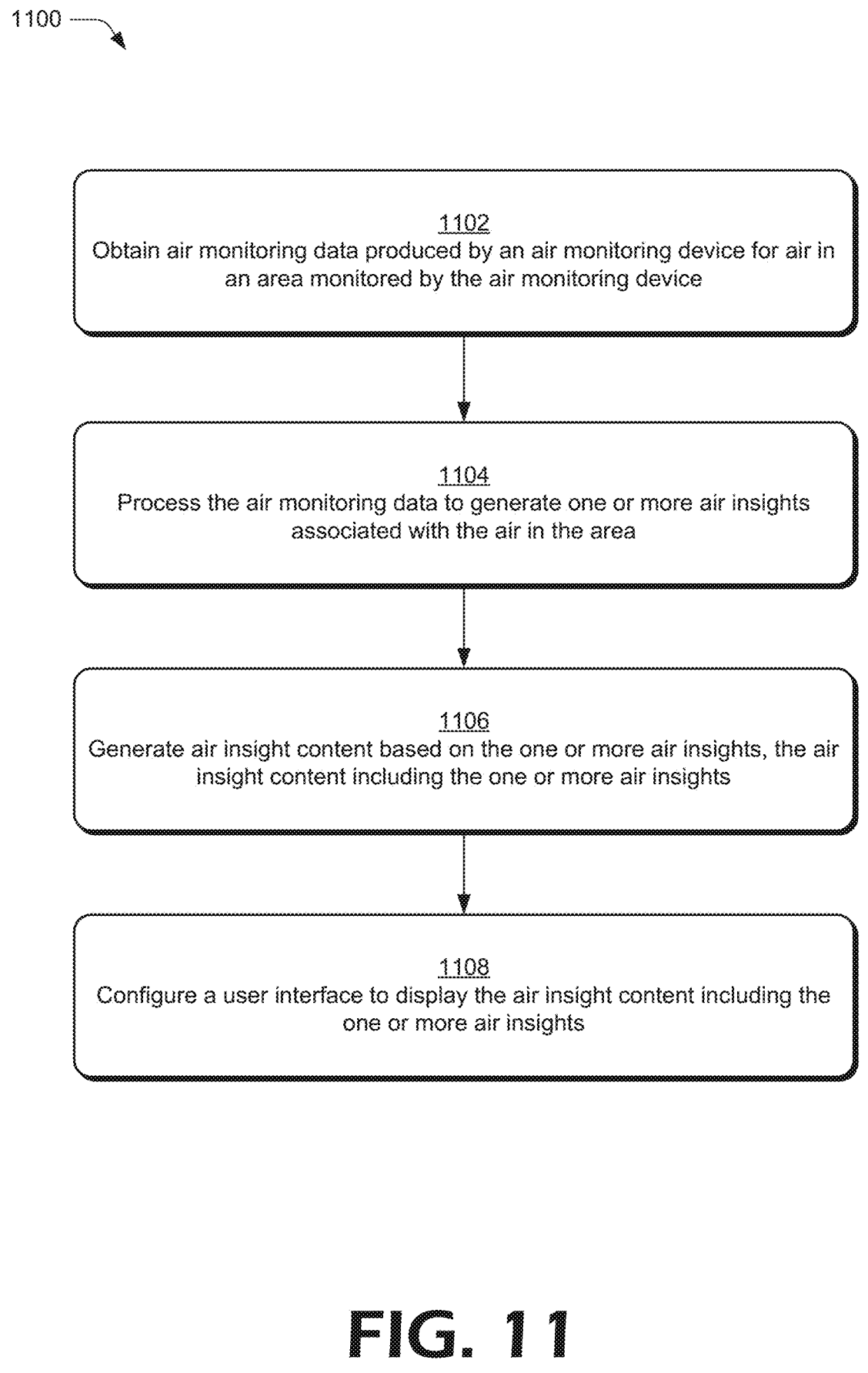

1100

1102
Obtain air monitoring data produced by an air monitoring device for air in an area monitored by the air monitoring device 1104
Process the air monitoring data to generate one or more air insights associated with the air in the area 1106
Generate air insight content based on the one or more air insights, the air insight content including the one or more air insights 1108
Configure a user interface to display the air insight content including the one or more air insights

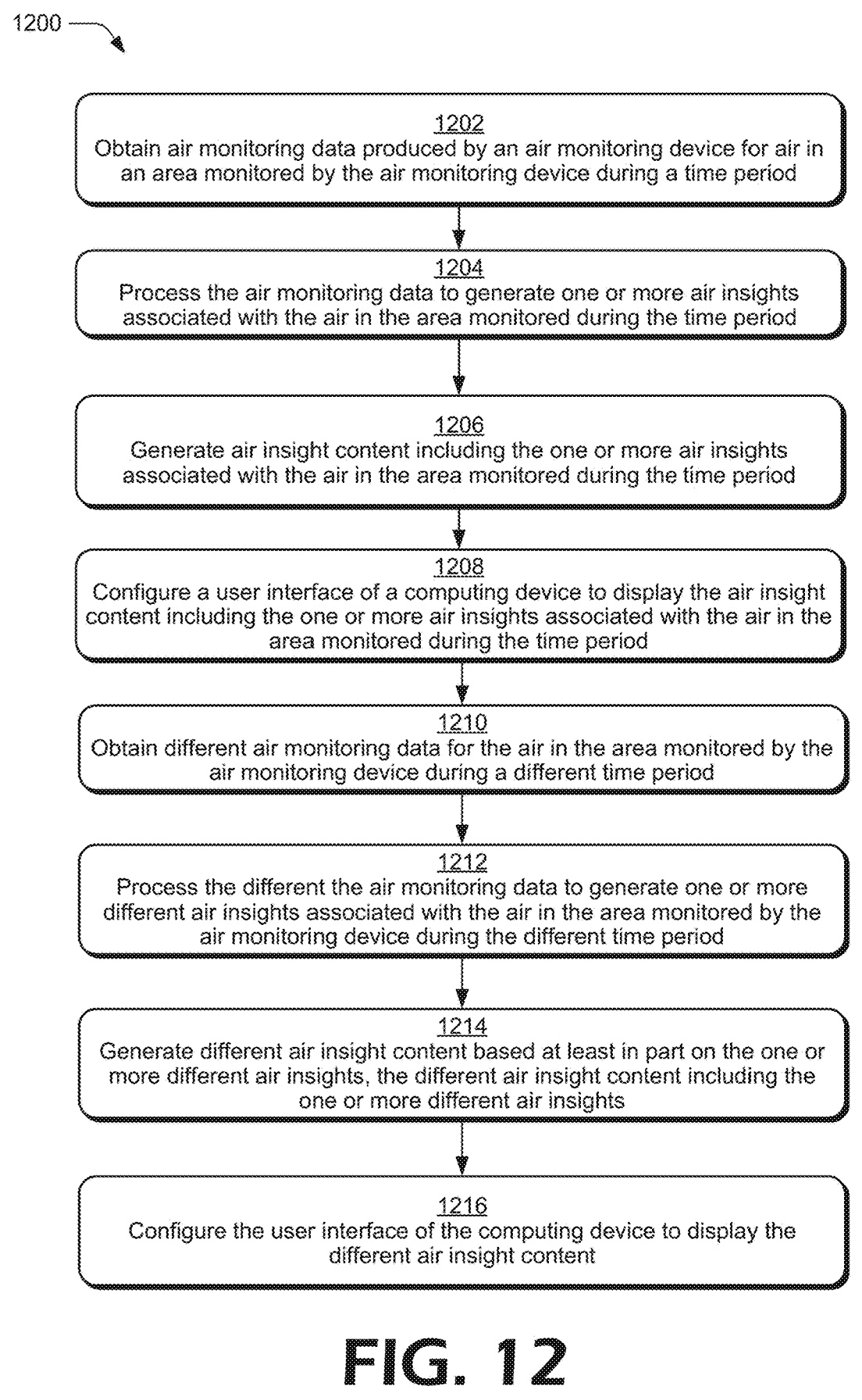

1202
Obtain air monitoring data produced by an air monitoring device for air in an area monitored by the air monitoring device during a time period 1204
Process the air monitoring data to generate one or more air insights associated with the air in the area monitored during the time period 1206
Generate air insight content including the one or more air insights associated with the air in the area monitored during the time period 1208
Configure a user interface of a computing device to display the air insight content including the one or more air insights associated with the air in the area monitored during the time period 1210
Obtain different air monitoring data for the air in the area monitored by the air monitoring device during a different time period 1212
Process the different the air monitoring data to generate one or more different air insights associated with the air in the area monitored by the air monitoring device during the different time period 1214
Generate different air insight content based at least in part on the one or more different air insights, the different air insight content including the one or more different air insights 1216
Configure the user interface of the computing device to display the different air insight content

FIG. 12

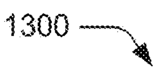

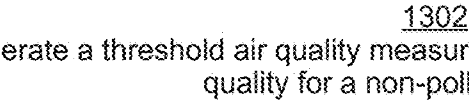

1302
Generate a threshold air quality measurement representing a threshold air quality for a non-polluted air quality 1304
Obtain, based on air monitoring data produced by an air monitoring device for air in an area monitored by the air monitoring device, an air quality measurement for the air in the area 1306
Determine that the air quality measurement for the air in the area exceeds the threshold air quality measurement 1308
Generate, based on the determination that the air quality measurement exceeds the threshold air quality measurement, an air insight conveying a pollution event 1310
Control, based on the air insight conveying the pollution event, access of a user account

FIG. 13

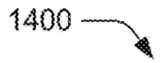
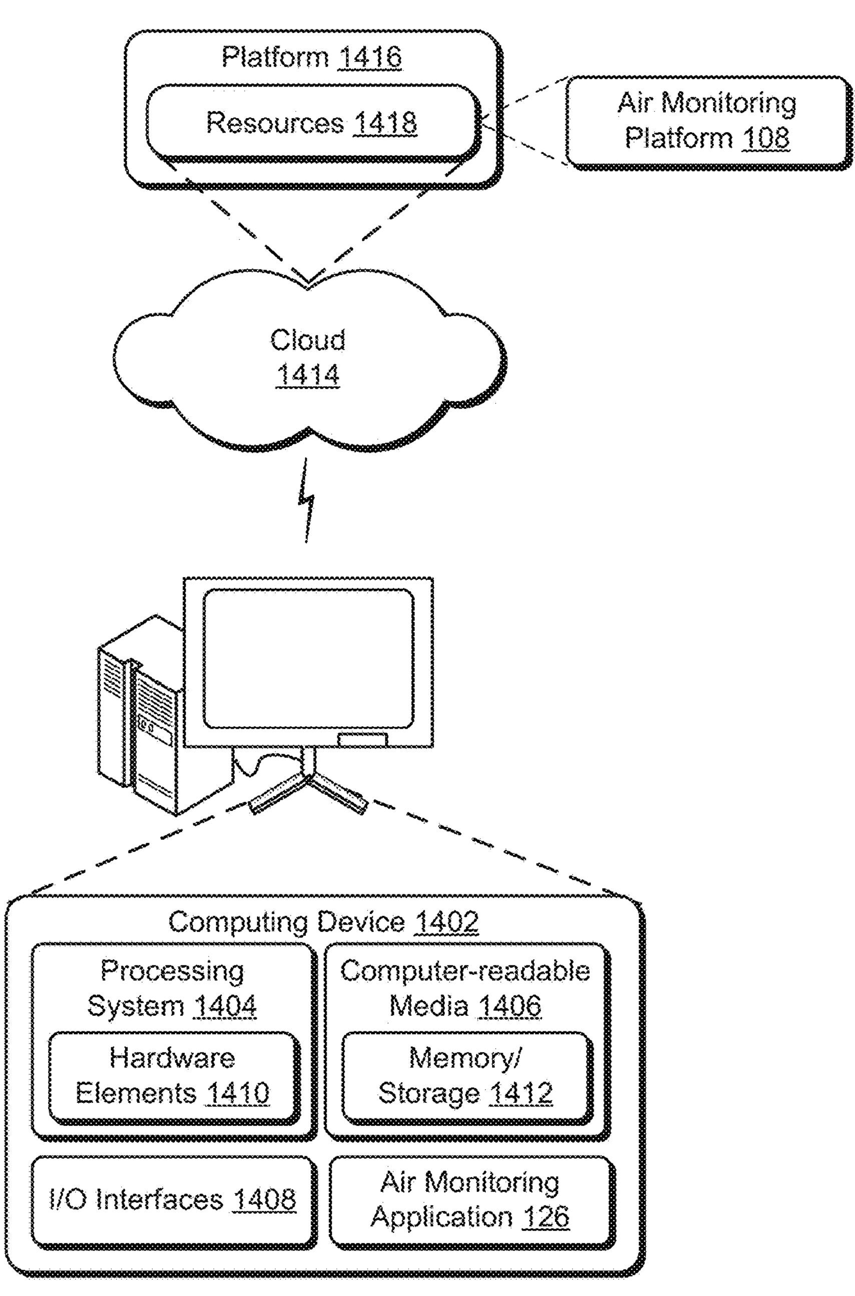
FIG. 14

AIR MONITORING AND AIR INSIGHT GENERATION

BACKGROUND

Despite the widely publicized effects of smoking and vaping, participation in smoking and vaping activities persists globally. This may be due to the growth of the legal *cannabis* industry, the high potency and popularity of vaping devices, and the addictive qualities and accessibility of nicotine and other smokables, to name just a few reasons. The participation in these activities has continued despite the presence and/or growth of areas having smokefree policies, laws, and rules, leading to smoking and vaping being unauthorized or against the law in various places. Additionally, many people view smoking and vaping as undesirable, even if it is allowed. Such unauthorized and undesirable smoking and vaping activities often result in adverse outcomes, such as permanent damage to a property. Examples of permanent damage include the persistence of residual particles from smoking or vaping, which act as long-term environmental pollutants that are irritating or hazardous to the health of occupants. Thus, those residual particles can make a property unpleasant or unsuitable for occupants.

Absent visual evidence, such as burn marks on fabrics, smoking or vaping-related stains or fragments, smoking or vaping-related trash, or recorded footage of smoking or vaping, conventional approaches to enforcing smokefree policies, laws, and rules do not include mechanisms for producing compelling evidence that proves unauthorized aerial pollutant-based policy violations.

SUMMARY

Air monitoring and air insight generation is described. In one or more implementations, an air monitoring device includes one or more sensors and produces air monitoring data for air in an area monitored by the air monitoring device. For instance, the one or more sensors are exposed to the air in the area and are used to produce particulate measurements which can be associated with time data, e.g., timestamps. An air monitoring application obtains the air monitoring data produced by the air monitoring device. The air monitoring application processes the air monitoring data to generate one or more air insights associated with the air in the area monitored by the air monitoring device. The one or more air insights are used by the air monitoring application to generate air insight content including, representing, or otherwise conveying the one or more air insights. The air monitoring application configures a user interface of a computing device to display the air insight content having the one or more air insights. In this manner, the air monitoring application provides air insight content associated with the air in the area monitored by the air monitoring device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion. The appended drawings illustrate, by way of example and not of limitation, various embodiments of systems, methods, and computer program products implementing the inventive subject matter.

FIG. 3 depicts an example of a system in which the air monitoring application of FIG. 1 receives a request for air insight content via user input and leverages the air monitoring device to obtain air monitoring data for the air in the area monitored by the air monitoring device.

FIG. 9 depicts an example of a user interface displaying an air insight as a notification responsive to determining that the air in an area monitored by an air monitoring device is of a polluted air quality.

FIG. 10 depicts an example of a system in which the air monitoring platform from FIG. 1 obtains an air insight conveying an air quality measurement and leverages the air insight to control access of a user account based on a determination of a pollution event.

FIG. 11 depicts a procedure in an example implementation in which a user interface is configured to display air insight content which includes one or more air insights.

FIG. 12 depicts a procedure in another example implementation in which a user interface is configured to present air insight content which includes different air insights over different periods of time.

FIG. 13 depicts a procedure of an example of an implementation in which access of a user account is controlled based on a determination of a pollution event.

FIG. 14 illustrates an example of a system including various components of an example device that can be implemented as any type of computing device as described and/or utilized with reference to FIGS. 1-13 to implement embodiments of the techniques described herein.

DETAILED DESCRIPTION

Overview

Figure 1:
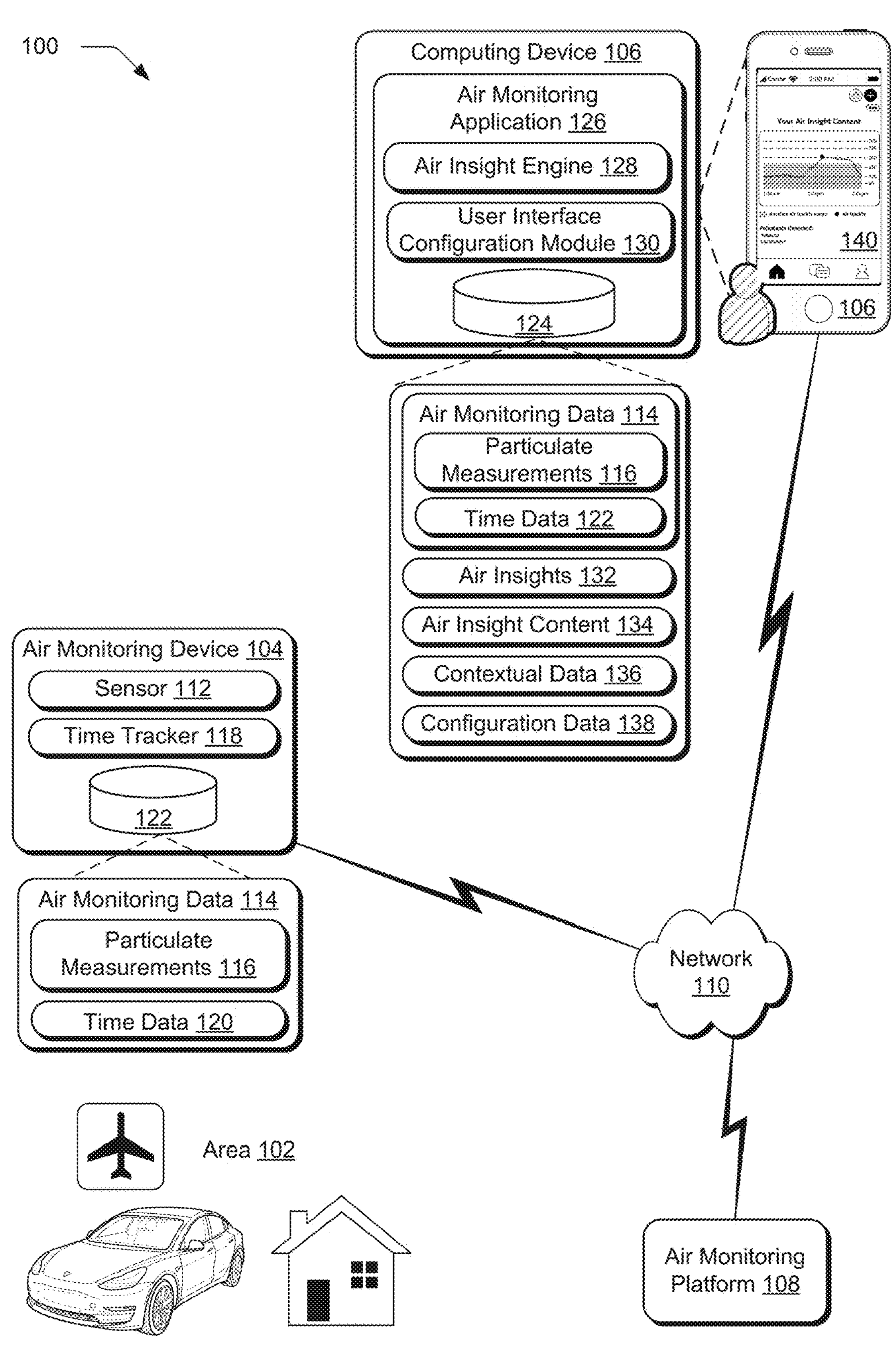
FIG. 1 is an illustration of an environment in an example implementation that is operable to employ techniques described herein.

Conventional approaches to enforcing policies prohibiting aerial pollutant activities (e.g., smoking) fail to prevent adverse outcomes for users of host accounts that make vehicles available to client accounts on online marketplace applications and platforms. Further, online marketplace applications and platforms for vehicles experience challenges in determining damages caused to the vehicles by unauthorized aerial pollutant activities by a participating user of a client account, in addition to determining a culpability of the participating user of the client account.

Overall, the conventional approaches for enforcing policies against aerial pollutant activities are ineffective at preventing the adverse outcomes for the users of the host accounts that make the vehicles available on online marketplace platforms. By way of example, one conventional approach for enforcing such policies includes the use of conventional smoke detectors. Conventional smoke detectors, however, are easy to identify and work around. By way of example, conventional smoke detectors often emit an audible alert noise and are fixed, immobile devices that are not easily concealable. Because conventional smoke detectors are easy to identify and therefore easy to circumvent, conventional approaches for enforcing such policies are ineffective.

Conventional smoke detectors are also not configured to determine when, how long, and at what intensity aerial pollution (e.g., smoke) occurs. Because conventional smoke detectors fail to determine when, how long, and at what intensity aerial pollution occurs, adverse outcomes result for users of host accounts due to the difficulty of determining the damage inflicted by the user of the client account and the culpability of the user of the client account.

The lingering smell of unauthorized aerial pollutants, such as smoke, damages the interior of vehicles made available by the host account. Removing such damage, if possible, results in monetary loss for the user of the host account. Inability to remove the damage results in a decreased property value of the vehicle owned by the user of the host account and decreases in subsequent bookings (e.g., to "rent" the property) due to the lingering effects of the aerial pollutant.

Determining the damages is challenging, in part, because participants of unauthorized aerial pollutant activities have strong incentives to not leave behind evidence of the unauthorized activity. As such, there is rarely visual evidence, such as ash, burn marks, or residue. Absent visual evidence, due to the remote structure of online marketplace platforms, it is challenging for online marketplace platforms to determine a culpability of a client account. Difficulty in determining the culpability of a client account results in inefficient and ineffective disputes between client accounts, host accounts, and online marketplace platforms.

The ineffectiveness of conventional approaches to enforcing policies prohibiting the aerial pollutant activities results in other adverse outcomes, such as lower user account retention, cancellations of subsequent bookings of vehicles made available on the online marketplace platform, increased bad debts from chargebacks, and reduced profitability.

To overcome these problems, techniques for air monitoring and air insight generation are leveraged. An air monitoring application, implemented at a computing device such as a smartphone, tablet, or wearable smart device, is configured to obtain air monitoring data from an air monitoring device that produces particulate measurements (e.g., using sensors) for air in an area monitored by the air monitoring device.

The air monitoring device and air monitoring application described herein resolve various shortcomings of conventional smoke detectors. Conventional smoke detectors, for instance, are immobile and fixed, audible, and fail to record when, how long, and at what intensity aerial pollution occurs. Unlike conventional aerial pollutant detectors, in one or more implementations, the air monitoring device described herein is one or more of: mobile, compact, easily concealable, silent or quieter than conventional smoke detectors, and records at least one of when, how long, and at what intensity aerial pollution occurs. In one or more implementations, a form factor of the air monitoring device is removable from the area monitored by the air monitoring device. By way of example, the air monitoring device may be temporarily affixed at a location of the area that makes the air monitoring device difficult to detect, such as via an attachment apparatus that enables the air monitoring device to be temporarily affixed at the location of the area. Because the air monitoring device is configured to be placed at the area without being permanently attached or fixed to the area, the form factor of the air monitoring device is removable from the area monitored by the air monitoring device.

In some cases, the air monitoring device produces particulate measurements for the air in the area at predetermined intervals in real-time, such as every second. Producing air monitoring data in real-time enables swift and timely action to prevent additional damage to an area being monitored, such as the interior of a vehicle.

The air monitoring application processes the particulate measurements produced by and received from the air monitoring device to determine one or more air insights, e.g., about the area's air quality. The air insights may include, by way of example and not limitation, whether the current air quality of the area exceeds, is equal to, or less than a threshold air quality, a trend of the air quality over a time period (e.g., whether the air quality measurements are increasing in value (improving), decreasing in value (degrading), or constant over the time period), or a rate of change of the air quality in the area monitored over a time period (e.g., how quickly the relevant particulate measurements are increasing or decreasing in value).

Notably, the air insights may be based on a variety of other data, in addition to particulate measurements, without departing from the spirit or scope of the described techniques. By way of example, the air insights may be determined based at least in part on contextual data, wherein the contextual data describes a context of the air monitoring. Examples of the contextual data include but are not limited to a type of vehicle (if the air monitoring device is producing air monitoring data for air in an area in a vehicle), or weather, humidity, seasonal, industrial, accident, or fire information local to the area monitored. Such features enable nuanced insights into the air of the area monitored by the air monitoring device, unlike conventional approaches to enforcing aerial pollutant policies.

The air monitoring and air insight generation techniques described herein confer various advantages. In accordance with the described techniques, for instance, air monitoring and air insight generation may be particularly suited to online platforms that provide access to properties, such as vehicles, as discussed above. For example, by monitoring air in a property (e.g., a vehicle) via an air monitoring device, generating air insights (associated with the monitored property) based on air monitoring data produced by the air monitoring device, and determining one or more air insights associated with the property monitored, online marketplace applications and platforms are enabled to prevent adverse outcomes for the host accounts of the online marketplace application.

For instance, responsive to determining, during a time period of a reservation of the monitored vehicle by the client account, that a pollution event has occurred, the platform may be configured to control a user account's access to instrumentalities, services, or vehicles made available by the platform. By way of example, a pollution event may be determined based on an air insight indicating that an air quality measurement for the air in the monitored vehicle exceeds a threshold air quality measurement. Additionally, or alternatively, the platform may be configured to include, in the profile of the client account (e.g., a risk profile, a public profile, etc.), air insight content including the pollution event as an air quality insight.

Additionally, or alternatively, responsive to determining the pollution event, the platform may be configured to control access of the host account. For instance, the platform may be configured to enable access to remedial instrumentalities, services, or outcomes, such as access to a monetary refund, instrumentalities to initiate enforcement against the unauthorized aerial pollutant activity, and so forth. The platform may be configured to automate transmission of air insight content including the air insight indicating the pollution event to a service provider system, such as an insurance service provider system. The air insight content may convey when, how long, and at what intensity the aerial pollution occurred. Additionally, or alternatively, the air insight content may be configured to include contextual information relevant to the pollution event, such as information about the host account, the client account, the trip, the vehicle, and so forth.

In comparison to the conventional techniques discussed above, such air monitoring and air insight generation techniques result in greater computational efficiency, in addition to a more expedient and effective recovery. This is because conventional techniques for enforcing aerial pollutant policies require host accounts to manually submit requests for enforcement and recovery.

Thus, via the use of the air monitoring and air insight generation techniques described herein, the policies against unauthorized aerial pollutant activities are more effectively enforced and thus prevents (e.g., for the host accounts of the vehicles) adverse outcomes resulting from unauthorized aerial pollutant activities. For instance, by restricting access to future reservations of vehicles by client accounts found to be in violation of smokefree policies by the air insights generated, adverse outcomes are prevented. Unlike conventional approaches to enforcing aerial pollutant policies, the techniques described herein prevent friction at online marketplace applications and platforms, unpredictability for host accounts that make vehicles available via online marketplace applications and platforms, and instills a greater confidence in hosting vehicles with online marketplace applications and platforms.

The air monitoring and air insight generation techniques described herein confer various additional advantages via the generation and presentation of air insight content including one or more air insights. In accordance with the described techniques, the air monitoring application configures a user interface to present one or more elements of air insight content including one or more air insights, the one or more elements representative of at least one of the one or more air insights. By way of example, such air insight content may include one or more of visual elements, audio elements, and text elements, to name a few. Further, configuring the user interface may include determining which air insights to include in the user interface (of multiple candidate insights) as well as how to present the selected air insights to the user. In some cases, for example, the user interface is configured to present a limited number of air insight content including a limited number of air insights (e.g., one insight or two insights), while preventing the display of other information, e.g., without displaying the air insight content as an air quality graph or without displaying a number corresponding to current air quality of the area monitored by the air monitoring device.

As described throughout, a visual element may be configured as part of the air insight content to visually present one or more air insights, such as via a color field, symbol, shape, or other visual element. For example, rather than presenting an air quality graph which includes numbers indicating air quality measurements as the air insight content, the air monitoring application may instead present a visual element as the air insight content, the visual element indicating that the area's air quality is below a threshold air quality indicating a non-polluted air quality, e.g., by presenting a green color field in the user interface which indicates that the air quality measurement for the air in the area is below the threshold air quality measurement. As another example, the air monitoring application may present air insight content as a shape that represents an air insight such as a trend of the air quality measurements over time or a rate of change of the air quality measurements over a time period. As compared to conventional approaches, this improved user interface presents air insights that are important to the user and are easy for the user to understand (e.g., a green color field indicating a non-polluted air quality), while limiting the display of information (e.g., an air quality graph) that the user may not understand.

In order to configure the user interface, the air monitoring application may leverage configuration data which maps air insights to different air insight content elements and controls which air insights are presented to a particular user at a given time and how those air insights are presented, e.g., which one or more air insight content elements are incorporated into the configured user interface based on the one or more determined air insights. Broadly speaking, the configuration data may specify which air insight content element to use for an air insight. The configuration data may also include various user specified preferences. For example, the air monitoring application may receive user input specifying that the user interface only present a single insight at a time. User preferences which are persisted in the configuration data may also be based on "implicit" and/or "explicit" user feedback.

By presenting air insight content including air insights, the user interface described herein provides information that a user can easily understand with just a quick glance. When the air insight content has a color indicating that an area's most recent air quality measurement is within a non-polluted air quality range (e.g., below the threshold air quality measurement), for example, a user is able to understand this insight with just a quick glance at the user interface. Configuring a user interface with air insight content to present air insights can be particularly advantageous with mobile devices, which may have limited screen space for displaying information and also may limit inputs for obtaining detailed information.

Moreover, configuring the user interface to display meaningful insights in a manner that is easy for a user to comprehend, while reducing the presentation of information that can be difficult for users to understand (e.g., such as a spreadsheet of unprocessed particulate measurements), enables the user to better understand and focus on a limited number of air insights generated by the air monitoring application. Doing so enables users to better understand insights about the air quality of an area monitored by an air monitoring device, which leads users to take meaningful action when unauthorized pollutants, such as unauthorized allergen pollutants or smoke pollutants, are identified in a monitored area. Moreover, the configuration data, in some instances, adjusts the insights which are presented to the user over time to account for improvement in the user's understanding of the air monitoring data. The improved user interface, therefore, improves the consistency of users utilizing the air monitoring application which results in improved air monitoring and air insights, which can serve as evidence of unauthorized events in an area that cause air pollution.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example Environment

FIG. 1 is an illustration of an environment 100 in an example of an implementation that is operable to generate air insight content for presentation of air insights based on air monitoring data produced by an air monitoring device, as described herein. The illustrated environment 100 includes area 102, which is depicted as being monitored by an air monitoring device 104. The air monitoring device 104 may be located or otherwise positioned within (e.g., moved into) or proximate to the area 102. Alternatively, or additionally, the air monitoring device may be proximate to the area 102. The illustrated environment 100 also includes computing device 106 and an air monitoring platform 108. In one or more implementations, the air monitoring device 104, computing device 106, and air monitoring platform 108 are communicatively coupled, such as via a network 110.

Alternately or additionally, the air monitoring device 104 and the computing device 106 may be communicatively coupled in other ways, such as using one or more wireless communication protocols or techniques. By way of example, the air monitoring device 104 and the computing device 106 may communicate with one another using one or more of Bluetooth (e.g., Bluetooth Low Energy links), near-field communication (NFC), 5G, and so forth.

In accordance with the described techniques, the air monitoring device 104 is configured to provide measurements associated with the area 102. The area 102 may be any type of area, such as enclosed or indoor areas (e.g., a cabin, an automobile interior, one or more rooms, and so on), outdoor or open-air areas, rooms, and vehicles, just to name a few.

In one or more implementations, the air monitoring device 104 is configured with a sensor 112 that detects (e.g., continuously) particulates that are indicative of the area 102's air quality and enable production of air monitoring data, such as measurements of particulates in the air in the area 102. The air monitoring device 104 may be configured to track time via a time tracker 118 to associate time data 120 (e.g., timestamps) with the air monitoring data 114. In one or more implementations, for instance, the time tracker 118 is a real-time clock. In some examples, the time data 120 is produced in the Universal Time Coordinated ("UTC") standard. In the illustrated environment 100 and throughout the detailed description these various measurements are represented as air monitoring data 114.

Additionally, the air monitoring device 104 transmits the air monitoring data 114 to the computing device 106, such as via a wireless connection. The air monitoring device 104 may communicate these measurements in real-time, e.g., as they are produced using the sensor 112. Alternately or in addition, the air monitoring device 104 may communicate the air monitoring data 114 to the computing device 106 at set time intervals. For example, the air monitoring device 104 may be configured to communicate the air monitoring data 114 to the computing device 106 every second.

Certainly, an interval at which the air monitoring data 114 is communicated may be different from the examples above without departing from the spirit or scope of the described techniques. The measurements may be communicated by the air monitoring device 104 to the computing device 106 according to other bases in accordance with the described techniques, such as based on a request from the computing device 106. Regardless, the air monitoring device 104 may maintain the air monitoring data 114 of the area 102 at least temporarily, e.g., in storage device 122 of the air monitoring device 104. The computing device 106 may also be configured to maintain the air monitoring data 114 of the area 102 at least temporarily, e.g., in storage device 124 of the computing device 106. In one or more implementations, the storage device 122 and the storage device 124 are computer-readable storage media.

Although illustrated as a mobile device (e.g., a mobile phone), the computing device 106 may be configured in a variety of ways without departing from the spirit or scope of the described techniques. By way of example and not limitation, the computing device 106 may be configured as a different type of mobile device (e.g., a wearable device or tablet device). In one or more implementations, the computing device 106 may be configured as a dedicated device associated with the air monitoring platform 108, e.g., with functionality to obtain the air monitoring data 114 from the air monitoring device 104, perform various computations in relation to the air monitoring data 114, display information related to the air monitoring data 114 and the air monitoring platform 108, communicate the air monitoring data 114 to the air monitoring platform 108, and so forth.

In accordance with the discussed techniques, the computing device 106 is configured to implement user interfaces for air insight 132 presentation. In the illustrated environment 100, the computing device 106 includes an air monitoring application 126 having an air insight engine 128 and a user interface configuration module 130, in addition to a storage device 124. The computing device 106 further includes a user interface 140. The storage device 124 of the computing device 106 is also configured to store air insights 132 generated by the air insight engine 128, air insight content 134 generated based on the air insights 132, contextual data 136 relevant to the air monitoring data 114 and the area 102, and configuration data 138 for use by the user interface configuration module 130 to configure a user interface 140 to include at least a portion of the air insight content 134. The storage device 124 may be one or more databases or other types of storage capable of storing the air monitoring data 114.

In one or more implementations, the air monitoring data 114, air insights 132, air insight content 134, contextual data 136, and/or the configuration data 138 may be stored at least partially remote from the computing device 106, e.g., in storage of the air monitoring platform 108, and retrieved or otherwise accessed in connection with configuring and outputting (e.g., displaying) user interfaces 140 for air insight presentation. For instance, the air monitoring data 114 and/or the configuration data 138 may be generally stored in storage of the air monitoring platform 108 along with the air monitoring data 114, and some of that data may be retrieved or otherwise accessed on an as-needed basis to generate air insights 132 and/or to display user interfaces 140 for air insight presentation.

Broadly speaking, the air monitoring application 126 is configured to support interactions with a user that enable insights about the area 102's air to be presented in a customized manner. This may include, for example, obtaining the air monitoring data 114 for processing (e.g., to determine an air insight), receiving information about the area 102 monitored (e.g., through an onboarding process, user feedback, geolocation detection, and so forth), causing alerts to be output, causing information to be communicated to a service provider system, causing information to be communicated to the air monitoring platform 108, and so forth.

In one or more implementations, the air monitoring application 126 also leverages resources of the air monitoring platform 108 in connection with user interfaces 140 for air insight presentation. As noted above, for instance, the air monitoring platform 108 may be configured to store data, such as the air monitoring data 114 and the configuration data 138 associated with a user account, such as a host user account or a client user account. In one or more implementations, the user account is a user account of the air monitoring application 126 or the computing device 106. The air monitoring platform 108 may also provide updates and/or additions to the air monitoring application 126. The air monitoring platform 108 may control access of a user account to the air monitoring platform 108 or the air monitoring application 126 based on air insights 132 generated, such as by restricting access of a user account.

Further still, the air monitoring platform 108 may train, maintain, and/or deploy algorithms (e.g., machine learning algorithms) to generate predictions in connection with determining air insights, such as by using the wealth of data produced from the area 102 (and/or other areas) by the air monitoring device 104 and other air monitoring devices. One or more such algorithms may require an amount of computing resources that exceeds the resources of typical, personal computing devices, e.g., mobile phones, laptops, tablet devices, and wearables, to name just a few. Nonetheless, the air monitoring platform 108 may include or otherwise have access to the amount of resources needed to operate such algorithms, e.g., cloud storage, server devices, virtualized resources, and so forth. The air monitoring platform 108 may provide a variety of resources that the air monitoring application 126 leverages in connection with enabling air insights to be presented via user interfaces 140.

In accordance with the described techniques, the air monitoring application 126 is configured to utilize the user interface configuration module 130 to configure and cause output of one or more user interfaces 140 that present air insights 132. The user interface configuration module 130 may configure a user interface 140, for instance, and the air monitoring application 126 may cause display of the configured user interface 140 via a display device of the computing device 106. By way of example, the user interface configuration module 130 may configure the user interface 140 based on the configuration data 138 to include one or more air insight content including air insights.

Broadly speaking, the configuration data 138 controls which air insights are presented via the computing device 106 at a given time and how those insights are presented. In one or more implementations, for instance, the configuration data 138 may comprise user specified preferences. For example, the air monitoring application 126 may receive user input specifying that the user interface 140 only present a single air insight 132 at a time. In this scenario, the air monitoring application 126 may cause this preference to be persisted in the configuration data 138, such that when the user interface configuration module 130 configures the user interface 140 to present only a single air insight 132 via a respective air insight content 134 at a time.

As discussed above and below, a variety of insights may be determined based on the air monitoring data 114 of the area 102 in accordance with the described techniques. In the context of producing air monitoring data 114, e.g., continuously, and obtaining data describing such measurements, consider the following discussion of FIG. 2.

Obtaining Air Monitoring Data

Figure 2:
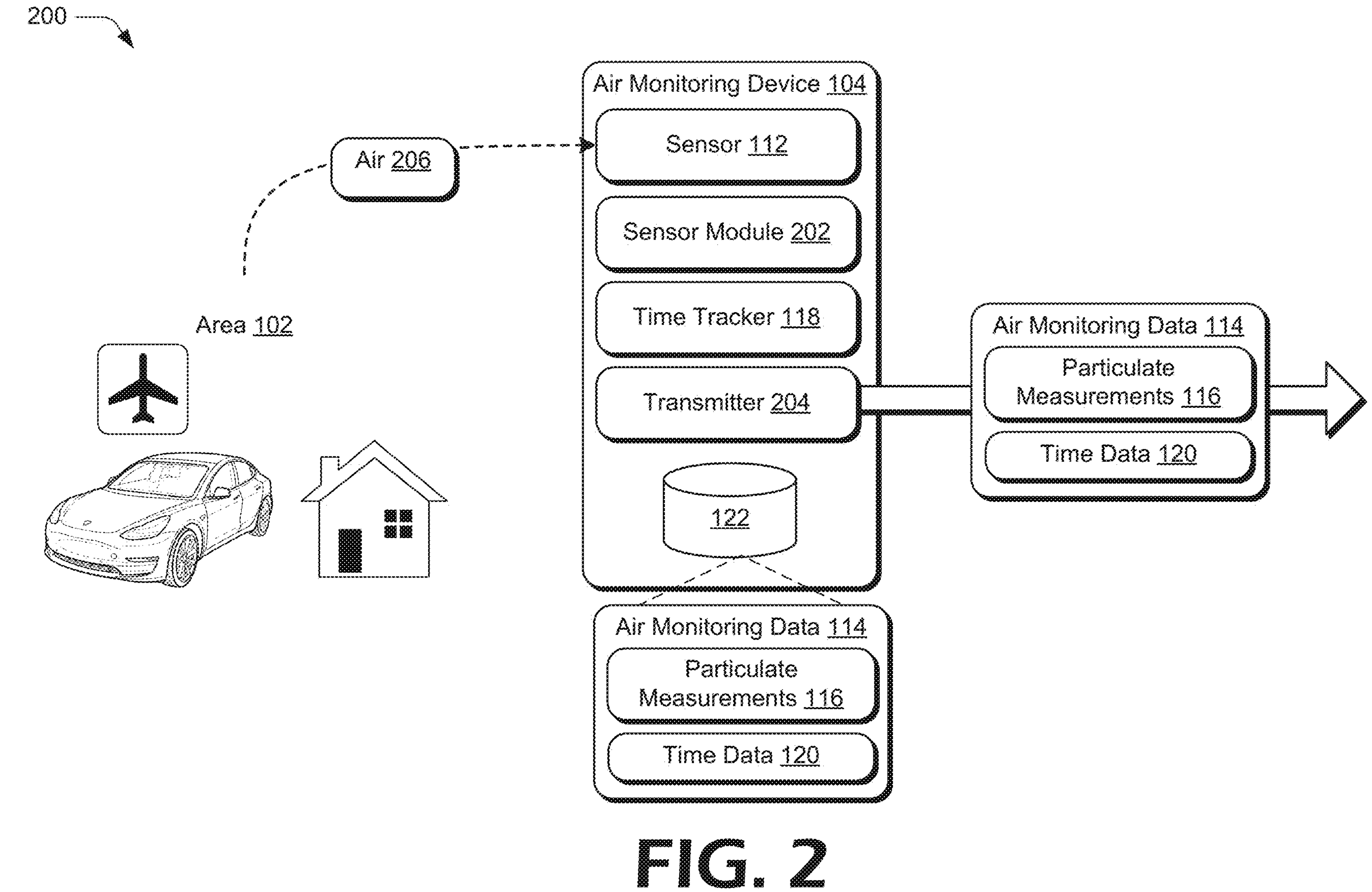
FIG. 2 depicts an example of the air monitoring device in greater detail.

FIG. 2 depicts an example 200 of an implementation of the air monitoring device 104 in greater detail. It is to be appreciated that the air monitoring device 104 may vary in implementation from the following discussion in various ways without departing from the spirit or scope of the described techniques.

In this example 200, the air monitoring device 104 is illustrated to include a sensor 112, sensor module 202, time tracker 118, transmitter 204, and storage device 122. The air monitoring device 104 and its components may have a variety of form factors without departing from the spirit or scope of the described techniques.

Here, the air monitoring device 104 produces air monitoring data 114 for air 206 in area 102. The air monitoring data 114 may include one or more measurements of properties of the air 206 in the area 102 monitored. The particulate measurements 116 include measurements of particulate suspended in air 206 in the area 102 monitored. The particulate measurements 116 may include information regarding characteristics of the particulate, such as the size (e.g., diameter), shape, reflectivity, color, or type of the particulate.

In operation, the sensor 112 is communicatively coupled to the sensor module 202 via at least one communication channel which can be a wireless connection or a wired connection. Communications from the sensor 112 to the sensor module 202 or from the sensor module 202 to the sensor 112 may be implemented actively or passively and these communications may be continuous (e.g., analog) or discrete (e.g., digital). Additionally, or alternately, the air monitoring device 104 may include additional sensors to the sensor 112 to initiate the production of air monitoring data 114.

In one or more examples, the sensor 112 is configured to capture stimuli associated with the air 206 in the area 102, such as motion, heat, and light stimuli. The sensor 112 may be further configured to convert captured stimuli into electrical signals that are passed as sensor data to the sensor module 202. Examples of the sensor data include but are not limited to one or more diffraction data, light intensity data (e.g., scattered light intensity data), angular scattering data, spatial intensity data, intensity flux data, and so forth.

The sensor module 202 is configured to process the sensor data produced by and passed from the sensor 112 to produce the air monitoring data 114. Examples of the air monitoring data 114 includes but is not limited to particulate measurements 116 (e.g., particle size measurements of the air 206 in the area 102), a volume of at least a part of the air 206 in the area 102, and so forth.

In at least one example, the sensor 112 uses laser scattering to radiate suspended particulate in a volume of the air 206 and produces the sensor data based on the radiated suspended particulate of the air 206; this sensor data is processed by the sensor module 202 to produce the air monitoring data 114 In at least one example, the sensor module 202 is configured to calculate particle diameters of the suspended particulate in the air 206 and a number of the suspended particulate with different diameters per a unit volume of the air 206. In one example, the sensor 112 and the sensor module 202 are configured to produce a curve or a distribution of scattered light intensity as part of the particulate measurements 116 to produce changes in the scattering light intensity over time.

In one or more examples, the sensor module 202 and the sensor 112 are configured to detect air particles of a single particle size. In other examples, the sensor module 202 and the sensor 112 are configured to detect air particles of a multiple particle sizes. Alternately or additionally, the air monitoring device 104 includes multiple sensors to detect not only one or more air particles of one or more sizes, but also one or more environmental conditions, such as temperature, humidity, and so forth. Thus, the sensor module 202 and the sensor 112 (as well as any additional sensors) may detect the presence of one or more particle sizes, the absence of one or more particle sizes, and/or changes in one or more environmental conditions.

In one or more implementations, the sensor module 202 may include a processor and memory (not shown). The sensor module 202, by leveraging the processor, may produce the air monitoring data 114 based on the communications with the sensor 112 that are indicative of the above-discussed changes, such as communications of the signal data produced by the sensor 112. Based on these communications from the sensor 112, the sensor module 202 is further configured to generate communicable packages of data that include at least a part of the air monitoring data 114.

In at least one example, the sensor module 202 is further configured to generate a communicable package of data that includes at least one particulate measurement 116. In one or more implementations, the sensor module 202 may configure those packages to include additional data, including, by way of example and not limitation, a sensor identifier, a sensor status, temperatures that correspond to the particulate measurements 116, measurements of other analytes that correspond to the air monitoring data 114, and so forth. The communicable packages of air monitoring data 114 may include concentration measurements, such as concentration measurements in standard or environmental units.

In one or more examples, the communicable packages of air monitoring data 114 include particulate measurements 116 including a count of particulate matter per a unit of the air 206 (e.g., per 0.1 L of the air 206) that is categorized into differently sized particle categories, for instance categories categorizing different diameters of the particulate matter produced by the sensor module 202. Examples of differently sized particle categories include differently sized particle categories of 0.3 μm, 0.5 μm, 1.0 μm, 2.5 μm, 5.0 μm, 10 μm, and so forth. It is to be appreciated that such packets may include a variety of data in addition to at least one air monitoring data 114 or particulate measurement 116 without departing from the spirit or scope of the described techniques.

In this example, the air monitoring device 104 stores the air monitoring data 114, including particulate measurements 116 and time data 120, in the storage device 122. In one or more implementations, the storage device 122 is configured as or includes removable media (e.g., a removable SD card) that can be used to transfer the air monitoring data 114 to a different device, such as computing device 106. Additionally, or alternatively, the air monitoring device 104 may be configured in a connection port that can be used to communicate or transfer the air monitoring data 114 via a connection cable to a different device. Additionally, or alternatively, the air monitoring device 104 may communicate or transfer the air monitoring data 114 via the transmitter 204 by using one or more of Bluetooth (e.g., Bluetooth Low Energy links), near-field communication (NFC), 5G, Wi-Fi, and so forth.

In implementations where the air monitoring device 104 is configured for wireless transmission, the transmitter 204 may transmit the air monitoring data 114 wirelessly as a stream of data to the computing device 106. Alternately or additionally, the sensor module 202 may buffer the air monitoring data 114 (e.g., in memory of the sensor module 202 and/or other physical computer-readable storage media of the air monitoring device 104) and cause the transmitter 204 to transmit the buffered air monitoring data 114 later at various intervals, e.g., time intervals (every second, every thirty seconds, every minute, every five minutes, every hour, and so on), storage intervals (when the buffered air monitoring data 114 reach a threshold amount of data or a number of measurements), and so forth. In one or more implementations, the air monitoring device 104 is compatible with a software development kit ("SDK"). The SDK may be integrated into the air monitoring application 126 to retrieve the air monitoring data 114 from the air monitoring device 104. In one or more examples, the air monitoring device 104 is configured to be powered by a lithium-ion polymer battery ("LiPo"), such as a rechargeable LiPo.

Having considered an example of an environment and an example of an air monitoring device 104, consider now a discussion of an example of details of the techniques for obtaining air monitoring data in a digital medium environment in accordance with one or more implementations.

FIG. 3 depicts an example 300 of a system in which the air monitoring application 126 of FIG. 1 receives a request 302 and leverages the air monitoring device 104 of FIG. 1 to obtain air monitoring data 114 associated with the air 206 of the area 102 monitored by the air monitoring device 104. The illustrated system of example 300 includes from FIG. 1 the computing device 106 having an air monitoring application 126 that includes a communication module 304 and an air insight engine 128. The communication module 304 is configured to receive requests 302 via user input by the computing device 106 and to transmit air monitoring data requests 306 to sources of air monitoring data 114, such as the air monitoring device 104.

This illustrated example 300 further includes from FIGS. 1 and 2 the air monitoring device 104 having a transmitter 204. As previously discussed, the transmitter 204 is configured to transmit air monitoring data 114 elsewhere, such as to the air monitoring application 126, the air insight engine 128 of the air monitoring application 126, the air monitoring platform 108 of FIG. 1, and so forth.

Here, the communication module 304 is depicted receiving the request 302. In one or more implementations, the request 302 is a request received via user input via a user interface 140 of the computing device 106. In one example, the request 302 is for air insight content 134. Additionally, or alternatively, the request 302 is configured to request air insights 132, air monitoring data 114, or contextual data 136, to name a few things that the request 302 is configured to request for. In one example, the request 302 is configured to conveniently retrieve prior pollution events, wherein a polluted air quality was detected by the air monitoring device 104, air monitoring application 126, or the air monitoring platform 108. The request 302 can be configured to include specific search query for air monitoring data 114, air insights 132, or air insight content 134, such a time period or a monitoring event that the air monitoring data 114, air insights 132, or air insight content 134 are associated with. The communication module 304 may be configured to receive user input specifying the amount or type of air insight content 134 to be displayed responsive to the request 302.

Here, the communication module 304 transmits the air monitoring data request 306 to the air monitoring device 104. By way of example, the communication module 304 and the air monitoring device 104 can communicate with one another using one or more of Bluetooth (e.g., Bluetooth Low Energy links), near-field communication (NFC), 5G, Wi-Fi, and so forth. In one or more examples, the air monitoring device 104 includes a nRF52 Bluetooth Low Energy board with a native Bluetooth chip. The computing device 106 and the air monitoring device 104 can be communicatively coupled in various ways, such as using one or more wireless communication protocols or techniques.

In this example 300, the air monitoring device 104 provides the air insight engine 128 of the air monitoring application 126 with the air monitoring data 114; the air monitoring data 114 includes the particulate measurements 116 and time data 120 produced by the air monitoring device 104. The air insight engine 128 is configured to obtain the air monitoring data 114 via the computing device 106 via the communication protocols or techniques discussed throughout this document, such as via Bluetooth.

Although the computing device 106 is configured to automatically retrieve air monitoring data, in this example 300, a user of the computing device 106 is enabled to initiate the manual retrieval of air monitoring data 114 for air insight content generation. This mechanism results in higher computational efficiency and is especially beneficial in situations where power resources are limited. By way of example, this higher computational efficiency is particularly beneficial battery levels of a computing device 106 are low or below a threshold battery level.

Consider now the following discussion of an example user interface including a user selectable button to initiate a request for air insight content.

Figure 4:
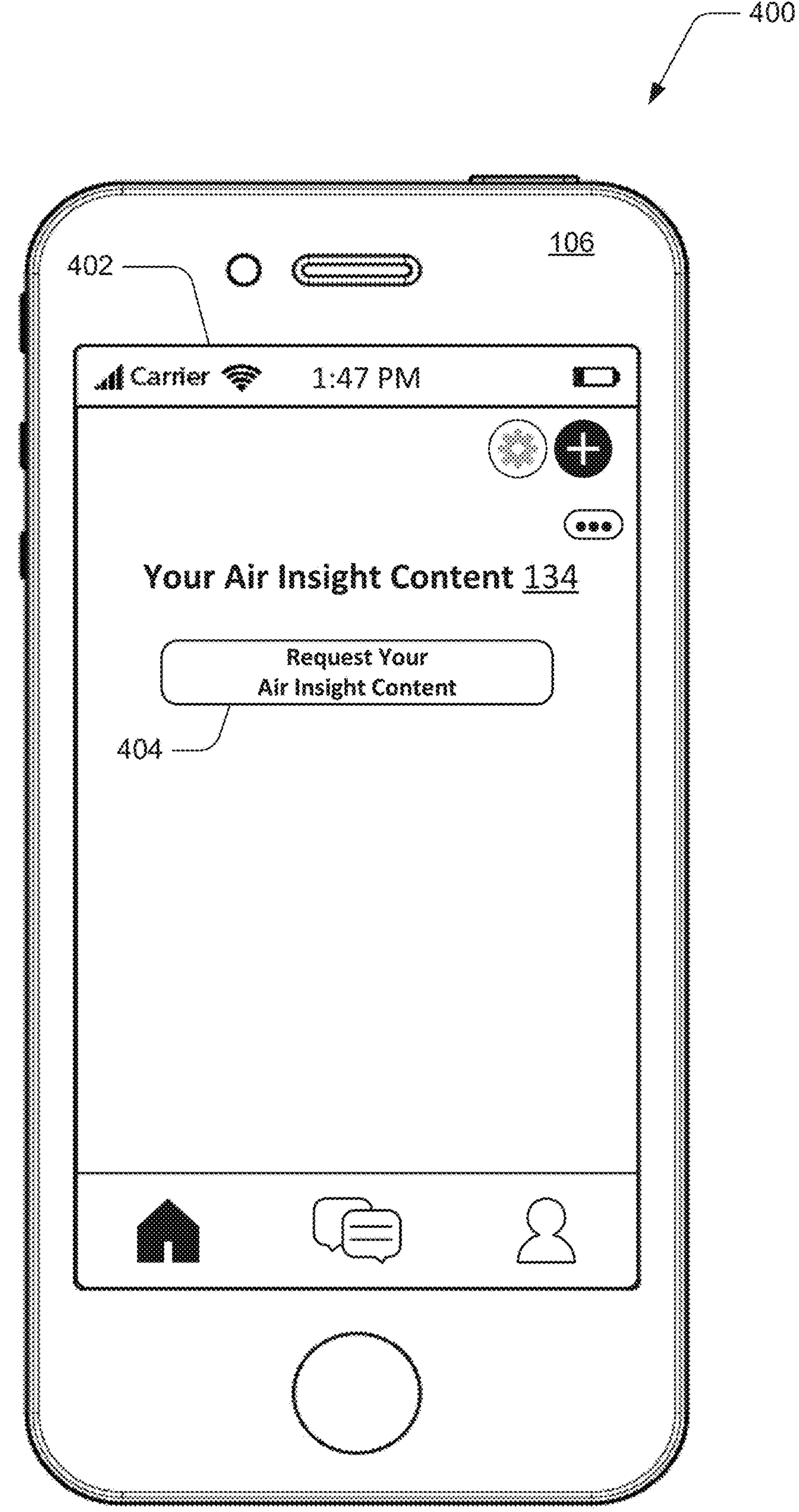
FIG. 4 depicts an example of an implementation of a user interface displayed in connection with receiving a request for air insight content via user input.

FIG. 4 depicts an example 400 of an implementation of an example user interface 402 of the computing device 106 of FIG. 1 receiving a request 302 for air insight content 134 via a user input selecting a selectable button 404 of the example user interface 402.

Here, the example user interface 402 of the computing device 106 is configured to include a selectable button 404 to initiate generation of the latest air insight content 134 having one or more air insights 132. The air monitoring application 126 receives the request 302 for the air insight content 134 via the user input. The air monitoring application 126 is configured to receive the user input via various techniques, including but not limited to touch, voice, gestures, eye movements, or facial expressions. As discussed above, the air monitoring application 126 may be configured to retrieve information relevant to the request, responsive to the request, such as air monitoring data 114 for the generation of air insight content 134.

Having considered an example 300 of a system and an example 400 of a user interface for requesting data needed for air insight content 134 generation and obtaining air monitoring data 114, consider now a discussion of examples of details of techniques for generating air insights 132 and air insight content 134 in a digital medium environment in accordance with one or more implementations.

Generating Air Insights and Air Insight Content

Figure 5:
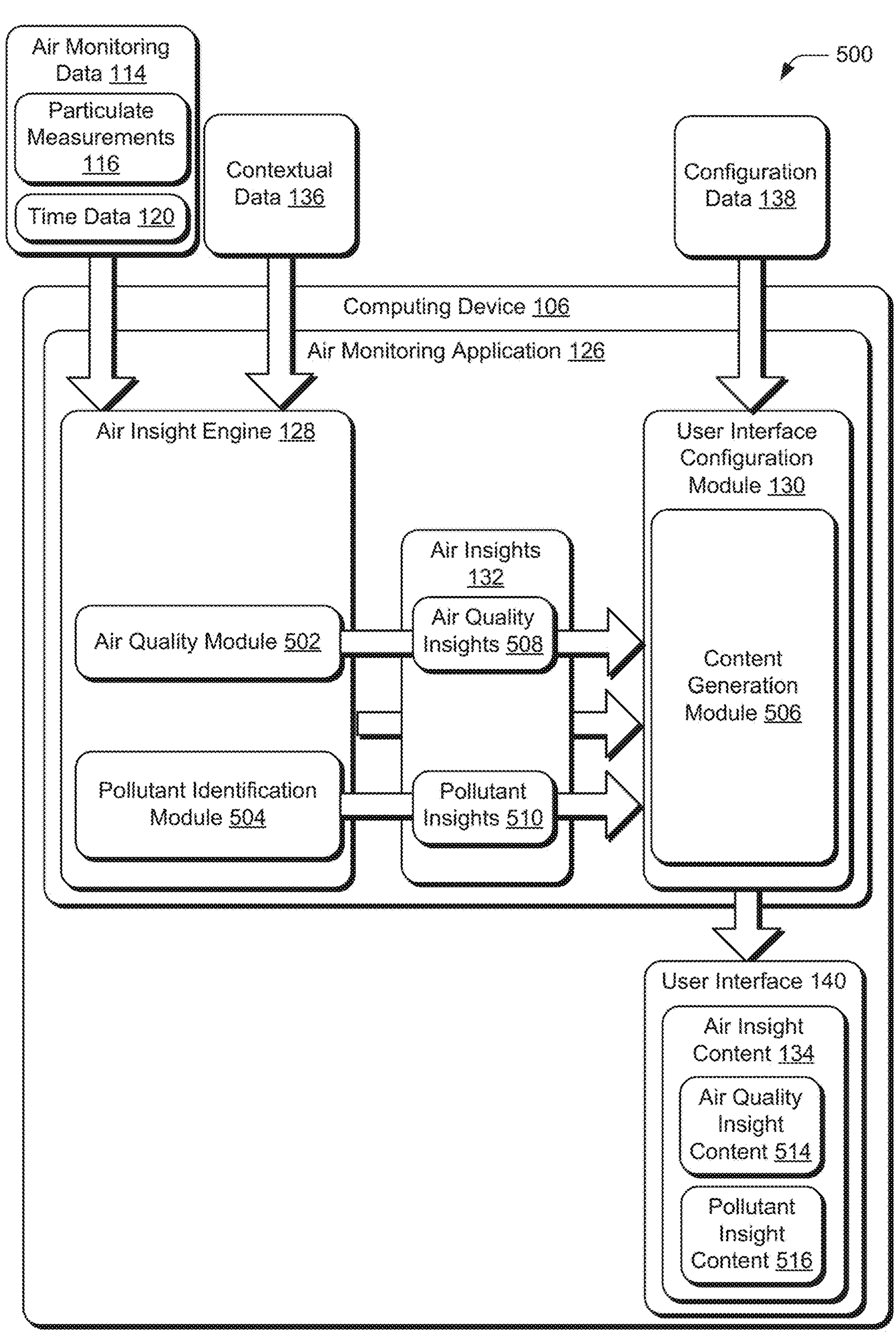
FIG. 5 depicts an example of a system in which an air monitoring application leverages a user interface configuration module and an air insight engine to configure a user interface to display air insight content.

FIG. 5 depicts an example 500 of a system in which the air monitoring application 126 from FIG. 1 leverages a user interface configuration module 130 and an air insight engine 128 to configure a user interface 140 including air insight content 134 for display by the computing device 106 from FIG. 1. The air insight engine 128 includes an air quality module 502 and a pollutant identification module 504. The user interface configuration module 130 includes a content generation module 506 that generates air insight content 134, such as air quality insight content 514 (including one or more air quality insights 508) and pollutant insight content 516 (including one or more pollutant insights 510).

In the illustrated example 500, the air insight engine 128 is configured to receive various types of data to enable the generation of air insights 132 associated with the air 206 of the area 102 monitored by the air monitoring device 104 of FIG. 1. Relevantly, the air insight engine 128 is configured to obtain air monitoring data 114 having particulate measurements 116 and time data 120 associated with the air 206 of the area 102 monitored by the air monitoring device 104 of FIG. 1. The air insight engine 128 may also be configured to obtain contextual data 136 relevant to the generation of air insights 132, such as humidity information, weather information, local fire information, and so forth. The contextual data 136 may, for example, indicate the location or GPS coordinates of the area 102 monitored, or features, conditions, or events that may be near the area 102 monitored or in a neighboring area surrounding the area 102 monitored. For example, the contextual data 136 may indicate characteristics of a region containing the area 102, and the contextual data may identify flora, fauna, commercial or industrial facilities, or relevant events such as fires around the area 102 monitored. Contextual data 136 may identify candidate particulates such pollen, animal dander, allergenic spores, traffic particles, industrial pollutants, and smoke from a nearby fire that may be present in the region surrounding the area 102 monitored.

Broadly speaking, the air insight engine 128 is configured to generate air insights 132 based at least in part on the air monitoring data 114. The air insights 132 are associated with the air 206 of area 102 monitored by the air monitoring device 104. The air insight engine 128 may be configured to determine a variety of air insights 132 based on the air monitoring data 114, such as the air quality insights 508 and pollutant insights 510 that identify pollutants of the area 102. At a given time from the time data 120, for instance, the air insight engine 128 may determine a single air insight 132 or may determine a plurality of air insights 132. The air insights 132 may include, by way of example and not limitation, a current air quality measurement, how a current air quality measurement compares to one or more other air quality measurements for a different times, how one or more air quality measurements compare to a threshold air quality measurement representative of a non-polluted air quality, a baseline air quality measurement, whether the current air quality measurement is exceeds a threshold air quality measurement and is thus conveys a polluted air quality, a trend of the air quality measurements over a time period (e.g., whether the air quality measurements are increasing in value, decreasing in value, or constant over the time period), a rate of change of the air quality measurements over a time period (e.g., how quickly the air quality measurements are increasing or decreasing in value over the time period), a variability of the air quality measurements over the time period, and how a variability of the air quality measurements at a first time period (e.g., a "current" time period) compares to a variability of the air quality measurements at one or more other time periods (e.g., one or more historical time periods), to name just a few. The air quality measurements can be generated by the air quality module 502, which is configured to generate air quality insights 508 based on the air monitoring data 114, such as the air quality measurements for any given time of the time data 120, based on the particulate measurements 116 of the air monitoring data 114.

In one or more implementations, the threshold air quality measurement may be set (or initially set) by a service provider system, the air monitoring device 104, the air monitoring application 126, or a user of the air monitoring application 126 or the air monitoring platform 108.

The threshold air quality measurement may be set (or initially set) based at least in part on contextual data 136. Relevantly, in one or more examples, the air insight engine 128 is configured to obtain the contextual data 136 associated with the area 102 monitored by the air monitoring device 104 of FIG. 1. The contextual data 136 may indicate information about possible sources of particulates of the area 102 and properties of and around the area 102 monitored. Contextual data 136 may identify, for example, nearby sources of allergens, seasonal or geographically relevant weather information, and so forth. Contextual data 136 may further indicate features of the area 102 monitored such as air treatment, the age of the area 102, or recent maintenance history for the area 102. In one or more implementations, this contextual data 136 enables generation of a threshold air quality measurement that is informed by relevant contextual data 136.

To continue the discussion on the setting of the threshold air quality measurement, the threshold air quality measurement may be set (or initially set) by a user account of the air monitoring application 126 (e.g., a host account), such as while onboarding with the air monitoring application 126 and/or initiating an air monitoring device 104 to produce the air monitoring data 114. The user account may have access (e.g., via the air monitoring application 126) to update the threshold air quality measurement subsequently and/or the air monitoring application 126 or the air monitoring platform 108 may update the range, e.g., in the manners mentioned above or in other ways. In at least one implementation, though, the air monitoring application 126 may prevent the user from setting and/or updating the threshold air quality measurement. It is to be appreciated that the threshold air quality measurement or measurements to which air quality measurements are compared to determine air insights 132 (e.g., pollution events) may vary in numerous ways without departing from the spirit or scope of the described techniques.

In one or more implementations, the air quality insights 508 generated by the air insight engine 128 include an indication (e.g., a conveyance, a description, etc.) of the air quality of the area 102 at any given time. The indication of the air quality may include an indication of a healthy air quality, a non-polluted air quality, a polluted air quality, an improving air quality, or a degrading air quality, just to name a few. In one or more examples, the indication of the air quality of the area 102 is determined based on a comparison of the threshold air quality measurement with air quality measurements generated based on the air monitoring data 114. The air quality module 502 is configured to generate an indication of a polluted air quality (e.g., a pollution event) when the air quality measurement exceeds the threshold air quality measurement. In one or more implementations, the air quality module 502 is configured to generate an indication of a non-polluted air quality when the air quality measurement is equal to lesser than the threshold air quality measurement.

The pollutant identification module 504 is configured to generate pollutant insights 510, such as identification of pollutants identified in air monitoring data 114 obtained. Example pollutants include allergenic pollutants, smoke pollutants, vape pollutants, odor pollutants, and so forth. Example allergenic pollutants include, tree pollen, grass pollen, ragweed pollen, animal dander (e.g., cat pelt), mold, dust mites, and so forth. Example smoke pollutants include smoke from tobacco, *cannabis, Salvia divinorum, opium, datura*, methamphetamine, crack cocaine, black tar heroin, phencyclidine, dimethyltryptamine, and 5-MeO-DMT, just to name a few. An example vape pollutant is propylene glycol, a common ingredient of vape juice.

In scenarios where the air insight engine 128 is implemented in part at the computing device 106 and in part at the air monitoring platform 108, the portion at the computing device 106 and the portion at the air monitoring platform 108 may determine different air insights 132, e.g., to reduce latency of providing a particular insight and/or because determining a particular insight may require an amount of computing resources that is a burden to operation of the computing device 106 (or simply is not possible with the computing device 106's resources).

Here, the user interface configuration module 130 having the content generation module 506 is configured to receive, from the air insight engine 128, the air insights 132 generated based on at least in part by the air monitoring data 114. In one or more implementations, the content generation module 506 is configured to generate air insight content 134 including the air insights 132 generated by the air insight engine 128. The air insight content 134 may include visual elements, graphs, textual summaries of air insights 132, audio elements, tactile elements, images, videos, and so forth, which present the air insights 132 generated. The content generation module 506 may be configured to generate the air insight content 134 based on various constraints, such as user specified preferences, computational limitations of the computing device 106, and the configuration data 138.

In this illustrated example 500, the user interface configuration module 130 is configured to receive the configuration data 138. Broadly speaking, the configuration data 138 controls what air insight content 134 is presented at a given time and how the air insights 132 are presented as air insight content 134. In one or more implementations, for instance, the configuration data 138 may include user specified preferences. For example, the air monitoring application 126 may receive user input specifying that the user interface 140 only present a single air insight 132 as air insight content 134 at a time. In this scenario, the air monitoring application 126 may cause this preference to be persisted in the configuration data 138, such that when the user interface configuration module 130 configures the user interface 140, the user interface configuration module 130 configures the user interface 140 to present only a single air insight 132 via a respective air insight content 134 at a time.

Alternatively, or additionally, the configuration data 138 may include rules that define a progression of insights for presentation over time, such that initially the user interface configuration module 130 is limited to configuring the user interface 140 to present a single air insight 132 at a time via a respective air insight content 134. After one or more criteria are satisfied, though, those rules may permit the user interface configuration module 130 to configure the user interface 140 to present two air insights 132 of different types (e.g., an air quality insight 508 and a pollutant insight 510) concurrently via respective air insight content 134. It is to be appreciated that the user interface configuration module 130 may obtain the one or more air insights 132 from different sources without departing from the spirit or scope of the described techniques.

In implementations where the configuration data 138 persists preferences that are based on user feedback, this feedback may be "explicit" or "implicit." As used herein, the term "explicit feedback" refers to feedback that a user knowingly provides in relation to air insight content 134 displayed as part of the user interface 140. By way of example, a user that is prompted to provide feedback about a visual element of the air insight content 134 (e.g., by display of a selectable thumbs up or thumbs down in relation to the visual element of the air insight content 134) and then provides such feedback (e.g., by selecting the thumbs up or thumbs down), knowingly provides feedback about the visual element of the air insight content 134 and thus provides explicit feedback.

Another example of explicit feedback is providing a rating, e.g., out of 5 stars or 1-10, about air insight content 134. Rather than prompt a user to provide feedback, explicit feedback may also include a user selection not to display certain air insight content 134 as part of a configured user interface 140. One example of this is a selection not to display air insight content that have different colors based on the determined air insight 132, e.g., this may be the case in a scenario where the user is color blind and thus unable to distinguish between different colors. Another example is when a user selects not to display an air quality trend graph as part of the air insight content 134 of the configured user interface 140.

In addition to not displaying visual elements of the air insight content 134 (e.g., feedback to omit visual elements of the air insight content 134), explicit user feedback can also include selections to affirmatively display various visual elements of the air insight content 134, such as an affirmative selection to display a color field that can be indicative of air insights 132, a current air quality measurement as part of an air quality insight 132, shapes indicative of trends in air quality (e.g., increasing, decreasing, or remaining constant), and so on. It is to be appreciated that a user may provide a variety of explicit feedback regarding which air insight content 134 to display, which air insight content 134 not to display, which air insight content 134 the user prefers, which air insight content 134 the user does not prefer, and so on, in accordance with the described techniques. This explicit feedback may be obtained and persisted in the configuration data 138 to control which air insight content 134 is determined for inclusion in the configured user interface 140.

As noted above, the feedback may also be implicit. As used herein, the term "implicit feedback" refers to feedback that is not explicit regarding air insight content 134, but corresponds to a detected user action in relation to the air insight content 134 indicative of a preference or non-preference for the air insight content 134. By way of example, implicit feedback may include navigating to a different view to obtain information associated with the area 102 monitored by the air monitoring device 104. Implicit feedback may also include, for example, using the air monitoring application 126 less than previously (e.g., viewing the air insight content 134 less), behaving in a way that can be detrimental to achieving air quality goals as measured by air quality measurements and/or other indicators, switching to a different application, and dismissing or snoozing notifications, to name just a few. Like with explicit feedback, the user interface configuration module 130 may capture a variety of implicit feedback about which air insight content 134 to display, which air insight content 134 not to display, which air insight content 134 the user prefers, which air insight content 134 the user does not prefer, and so on, in accordance with the described techniques. This implicit feedback may be obtained and persisted in the configuration data 138 to control which air insight content 134 is determined for inclusion in the configured user interface 140.

In one or more implementations, the configuration data 138 includes a mapping of air insights 132 to visual elements as part of the air insight content 134, such that the user interface configuration module 130 selects or otherwise determines the visual element to include in the user interface 140 depending on the air insight 132 determined. For example, this mapping may be a list of visual elements and respective air insights 132, such that if an air insight 132 is obtained, the user interface configuration module 130 can reference the list to identify the respective visual element. Alternatively or additionally, such a list may be configured as logic comprising if/then statements that the user interface configuration module 130 processes to determine the one or more visual elements of the air insight content 134 with which to configure the user interface 140, such that "if" a given air insight 132 is received the user interface configuration module 130 can process the statements to identify the visual element that is "then" used with the user interface 140 as part of the generation of the air insight content 134. The configuration data 138 may control "how" air insights 132 are presented as part of the user interface 140 as air insight content 134 in different ways without departing from the spirit or scope of the described techniques. In the context of user interfaces that may be presented with different air insights 132 as different air insight content 134 consider the following discussion of FIGS. 6-9.

Figure 6:
FIG. 6 depicts an example of an implementation of a user interface displaying air insight content which includes one or more air insights about air in an area monitored by an air monitoring device during a time period.

FIG. 6 depicts an example 600 of an implementation of a user interface 602 displaying air insight content 134 including one or more air insights 132 associated with air in an area 102 monitored by an air monitoring device 104 during a time period of 1:30 μm to 1:47 pm. The illustrated example 600 includes the computing device 106 of FIG. 1. The computing device 106 depicts the user interface 602 configured to display the air insight content 134, the air insight content 134 including pollutant insight content 516 and air quality insight content 514. The computing device 106 displays the example of the user interface 602 via a display device, such as a touchscreen. In this example 600 the air quality insight content 514 is an air quality graph including visual elements presenting various air quality measurements plotted over time for a time period. The user interface 602 also includes selectable elements that are selectable to display the air quality measurements of the air quality insight content 514 plotted over different time periods. It is to be appreciated that the air monitoring application 126 may plot the air quality insights (in this example, air quality measurements) on the air quality graph of the air quality insight content 514 over different periods of time without departing from the spirit or scope of the techniques described herein. In one or more implementations, though, these time periods correspond to time periods that precede a current time, e.g., to enable a user to review patterns in the air quality measurements that lead up to a current air quality measurement.

The pollutant insight content 516 includes a list of pollutants detected in the area 102 monitored by the air monitoring device 104. In one or more implementations, the pollutant insight content 516 includes a concentration or a quantity of the pollutant particulates detected in the area 102 monitored by the air monitoring device 104. The included concentration or quantity of pollutant particulates enables users to obtain a quantification of potential damages inflicted by the pollutant particulates detected. In the context of user interfaces that may be presented with air insight content 134 including air insights 132 in the form of an air quality graph, consider the following discussion of FIG. 7.

Figure 7:
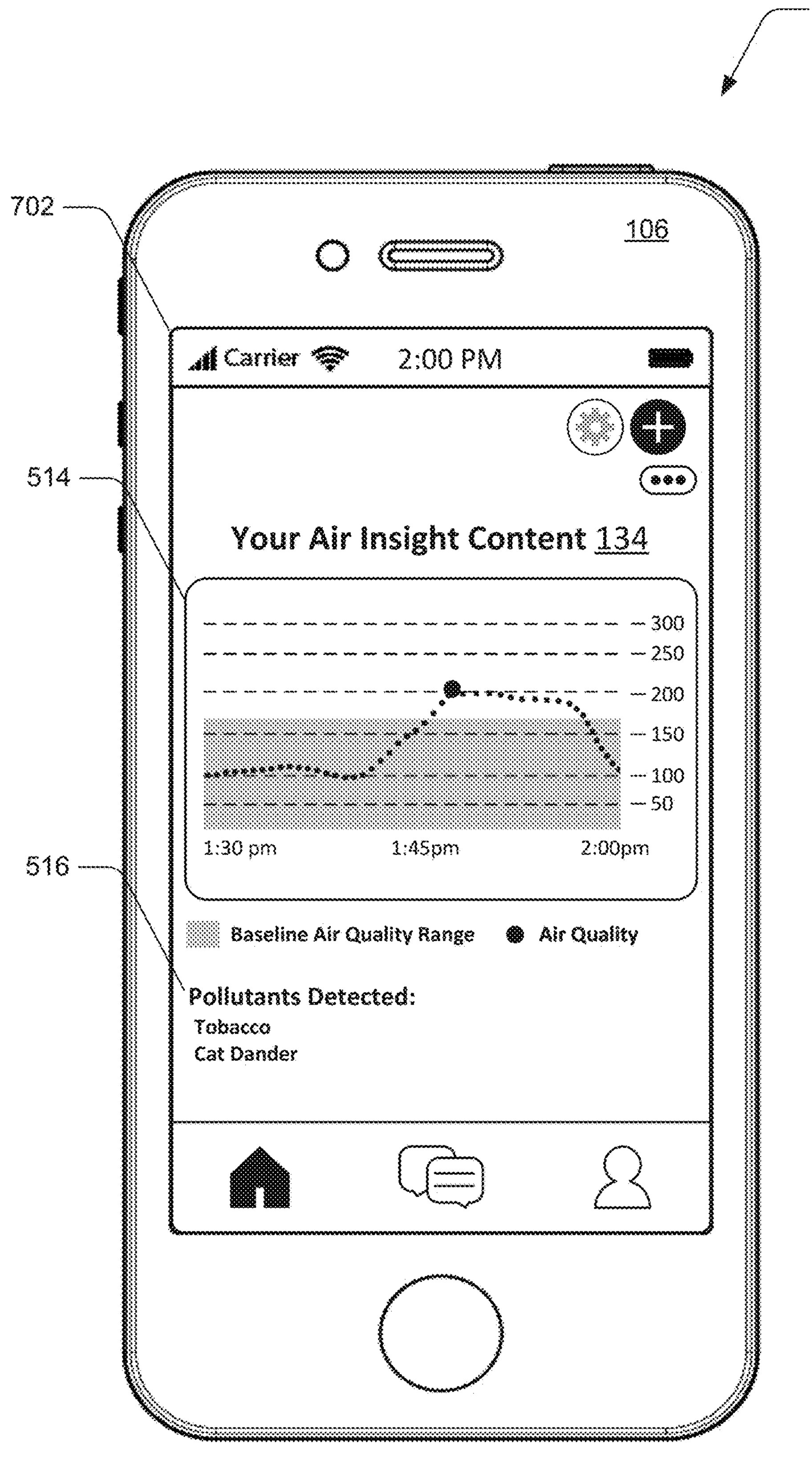
FIG. 7 depicts an example of an implementation of a user interface displaying air insight content which includes an air quality graph that plots values of air quality measurements of air in an area monitored by an air monitoring device during a different time period.

FIG. 7 depicts an example 700 of an implementation of a user interface 702 of FIG. 6 displaying air insight content 134 including air quality insight content 514 of FIG. 6 plotting values of air quality measurements of air in an area 102 monitored by the air monitoring device 104 during a different time period. The illustrated example 700 includes the computing device 106 of FIG. 1. The computing device 106 depicts the user interface 702 configured to display the air insight content 134, the air insight content 134 including pollutant insight content 516 and air quality insight content 514. The computing device 106 displays the example of the user interface 702 via a display device. In this example 700, the user interface 702 displays the air quality insight content 514 of FIG. 6: the air quality graph including visual elements presenting various air quality measurements plotted over time. The air quality insight content 514 depicts the air quality measurements plotted over the previous time period of 1:30 pm to 1:47 pm. The air quality insight content 514 of this example 700 further depicts different air quality measurements plotted over a subsequent period of time: from 1:47 pm to 2:00 pm. In one or more examples, the air quality insight content 514 updates in real-time over subsequent periods of time to depict subsequent air quality measurements plotted over the subsequent times. In one or more implementations, the air quality insight content 514 updates periodically at a pre-specified rate.

It is to be appreciated that the air monitoring application 126 may plot the air quality insights (for example, air quality measurements as depicted in examples 600 and 700 of FIGS. 6 and 7) on the air quality graph of the air quality insight content 514 over different periods of time without departing from the spirit or scope of the techniques described herein.

The pollutant insight content 516 of FIG. 7 includes a list of pollutants detected in the area 102 monitored by the air monitoring device 104. In one or more implementations, the pollutant insight content 516 includes a concentration or a quantity of the pollutant particulates detected in the area 102 monitored by the air monitoring device 104. The included concentration or quantity of pollutant particulates enables users to obtain a quantification of potential damages inflicted by the pollutant particulates detected.

In some cases, however, users may be confused about what the air quality measurements plotted over time mean. Consequently, those users may be unable to draw insights from the data and thus are unable to take proactive action regarding polluted air quality of the area 102 monitored by the air monitoring device 104. In other words, air quality graphs that plot air quality measurements over time can be difficult to understand and comprehend for some users. Even for users that are capable of determining some insight from the air quality graph of the air quality insight content 514, determining such an insight from the air quality graph can be laborious because it may require switching to a different user interface, or providing user input in relation to individual measurement representations on the air quality graph, to view individual values for each of a plurality of air quality measurements. Determining such an insight from the air quality graph alone may also require a user to already know or make a guess regarding various parameters required to make an accurate insight.

Regardless, the air quality graph may present too much information for some users (e.g., new users) before those users understand what the air quality graph means for the air quality of the area 102 monitored by the air monitoring device 104. As a result, presenting the air quality graph of the air quality insight content 514 can overwhelm and frustrate users, causing them to stop using the air monitoring application 126. Doing so can prevent users from recognizing the benefits obtained from utilizing air monitoring applications 126 and thus results in further degradation of the area 102 monitored. In contrast with presentation of air quality insight content 514 as an air quality graph, consider the following discussion of a user interface that presents simplified visual elements representative of a determined air quality insight 508.

Figure 8:
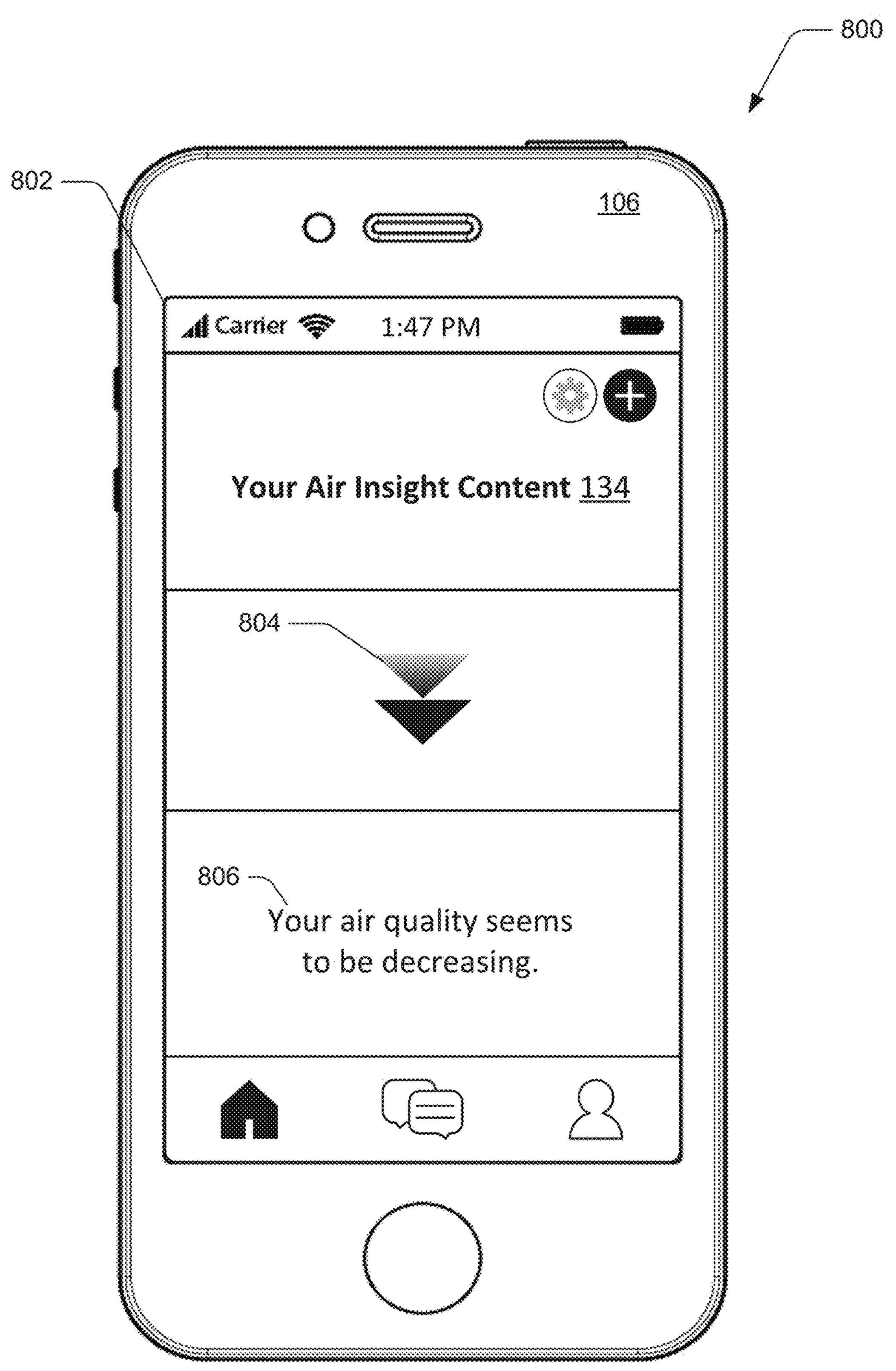
FIG. 8 depicts an example of an implementation of a user interface displaying air insight content which includes one or more air insights about air in an area monitored by an air monitoring device in real-time.

In the context of user interfaces that may be presented with air insight content 134 including air insights 132, consider the following discussion of FIG. 8.

FIG. 8 depicts an example 800 of an implementation of a user interface 802 of the computing device 106 of FIG. 1 displaying air insight content 134 including one or more air insights associated with air in the area 102 monitored by the air monitoring device 104 in real-time. While the user interface 802 does not include an air quality graph or a number corresponding to current air quality measurements of the area 102, the user interface 802 does include air insight content 134 in the forms of a visual element 804 and text 806 presenting the air insights 132. Broadly speaking, text 806 provided as air insight content 134 may be configured to supplement or explain visual elements 804 provided as part of the air insight content 134. In terms of explaining the visual elements 804, the text 806 may provide information that informs a user why the visual element 804 is included in the user interface 802. For instance, the text 806 may provide a textual description of the determined air insight 132. It is to be appreciated that such a textual description may range in detail from a general explanation of the air insight 132 to a more detailed description that includes numbers, how the numbers compare to other numbers (e.g., thresholds), statistical measures derived to determine the air insight 132 (e.g., averages, standard deviation, etc.), and so forth. Alternatively, or additionally, the text 806 may simply be related to the air quality of the area 102 without being specific to the visual element 804, e.g., the text 806 may comprise an encouragement, a warning, a reminder, and so forth.

Regarding the visual element 804, the visual element 804 may represent or otherwise convey an air insight 132. In this example, the visual element 804 represents an air quality insight 508, however, the visual element 804 may be configured by the user interface configuration module 130 to represent or otherwise convey any air insight 132, such as a pollutant insight 510. It is to be appreciated that the visual elements may have various shapes to represent or otherwise convey different air insights 132 without departing from the spirit or scope of the described techniques. Here, the visual element 804 (two downward pointing triangles or arrows) may represent an air insight 132 that the area 102's air quality is determined to be degrading. In one or more implementations, the visual element 804 may represent a rate of change of the air quality of the area 102, such as a slow (or low), medium, or high rate of change. In contrast, a different visual element (a single upward pointing triangle or arrow) may represent an air insight 132 that the area 102's air quality is determined to be improving.

The user interface configuration module 130 may configure the user interface 802 with one or more downward pointing triangles or arrows to represent decreases in some value, e.g., a downward trend in air quality measurements where more downward pointing arrows or triangles corresponds to a greater rate of decrease than fewer arrows or triangles. Moreover, different shapes may be used to represent that the air quality measurements of the area 102 are substantially the same or similar over a time period, e.g., the air insight engine 128 does not determine an increasing or decreasing trend in the area 102's air quality. Indeed, an air insight 132 may be represented by a variety of shapes in accordance with the described techniques. Consider now the following discussion of a user interface that presents air insight content configured as a warning notification.

FIG. 9 depicts an example 900 of a user interface 902 of the computing device 106 of FIG. 1 displaying air insight content 134 configured as a notification 904 responsive to determining an air quality insight that indicates that the air in the area 102 monitored by an air monitoring device 104 is of a polluted air quality.

In this illustrated example 900, the user interface configuration module 130 configures the user interface 902 to display the air insight content as a notification. In one or more examples, the notification 904 can include information relevant to the air insight 132 included in the air insight content 134, such as a reminder or a warning. Here, the notification 904 includes a warning that pollution was detected by the air monitoring device 104 five minutes ago. The notification 904 is user selectable to learn more about the air insight 132 of notification 904. Although the notification 904 of example 900 is visual content, the notification 904 may adopt different content formats, such as audio notifications or vibration notifications mapped to different air quality insights 508.

Having discussed exemplary details of the techniques for air insight generation and presentation, consider now a discussion of an example of details of techniques for controlling access based on air insights generated in a digital medium environment in accordance with one or more implementations.

Controlling Access Based on Air Insights

FIG. 10 depicts an example 1000 of a system in which the air monitoring platform 108 from FIG. 1 obtains air insights 132 and leverages the air insights 132 to control access of a user account of the air monitoring platform 108 based on a determination of a pollution event 1006. The illustrated example 1000 depicts the air monitoring platform 108 having a pollution module 1002 and an access controller 1004. The pollution module 1002 is configured to obtain one or more air insights 132. The pollution module 1002 is further configured to obtain or generate a threshold air quality measurement 1008 for the air in the area monitored, wherein the threshold air quality measurement 1008 is representative of a threshold measurement for a non-polluted air quality. In one or more implementations, the threshold air quality measurement 1008 is generated based at least in part on contextual data 136, such as a geolocation of the area, an U.S. Air Quality Index (AQI) associated with the geolocation of the area, a season of the area, a weather of the area, a humidity of the area, a size of the area, and so forth. Additionally, or alternatively, the threshold air quality measurement 1008 is generated based on previous air monitoring data produced by the air monitoring device for the air in the area monitored. For instance, the threshold air quality measurement 1008 may be generated based on previous air monitoring data produced as part of a protocol to ascertain one or more baseline air quality measurements for the area monitored by the air monitoring device.

Additionally, or alternatively, the pollution module 1002 is configured to obtain the threshold air quality measurement 1008, such as an objectively healthy air quality measurement, such as an air quality measurement of '100 AQI', which is recognized by the United States as an objectively 'acceptable' or 'moderately healthy' air quality measurement; an air quality measurement exceeding '100 AQI' is recognized by the United States as an objectively 'unhealthy' air quality measurement.

As discussed throughout, an air insight 132 that is an air quality insight 508 may convey an air quality for the air in the area monitored. For example, the air quality insight—that is an air quality measurement for the air in the area monitored—conveys the air quality for the air in the area monitored. By way of example, an air insight 132 may include an air quality insight 508, such as an air quality insight 508 indicating an air quality measurement exceeding a threshold air quality measurement, an air quality insight 508 indicating a polluted air quality.

The pollution module 1002 is further configured to determine or detect a pollution event 1006 based on the air insight 132. In one or more implementations, the pollution module 1002 is configured to generate a pollution event 1006 responsive to a determination that the air insight 132 includes an air quality measurement below the threshold air quality measurement. Additionally, or alternatively, the air pollution module 1002 is configured to generate a pollution event 1006 responsive to a determination that the air insight 132 includes an air quality insight 508 conveying a polluted air quality.

The access controller 1004 of the air monitoring platform 108 is configured to control access of user accounts—such as host accounts of property that make the property available to client accounts via the air monitoring platform 108, client accounts that reserve the property made available by the host accounts for a time frame—to the air monitoring platform 108. Responsive to receiving the pollution event 1006 from the pollution module 1002, the access controller 1004 controls the access to the air monitoring platform for one or more user accounts affiliated with the area monitored.

By way of example, responsive to receiving a pollution event 1006 associated with a reservation of a property during a time frame, the access controller 1004 is configured to control access of a client account responsible for the property during the time frame. Examples of the control of the access of the client account include, but are not limited to: banning (e.g., stealth banning) the client account, preventing the client account from making future reservations of different property made available via the air monitoring platform 108, canceling future reservations of different property made available via the air monitoring platform 108, applying a penalty to the client account, restricting the presentation of different property made available via the air monitoring platform 108, and so forth. In one or more implementations, the control of the access by the access controller 1004 may be lifted or removed responsive to an indication of compensation from the client account to the host account for the damages associated with the reservation of the property during the time frame.

Additionally, or alternatively, responsive to receiving the pollution event 1006 associated with the reservation of the property during the time frame, the access controller 1004 is configured to control access of the host account that made the property available for reservation during the time frame via the air monitoring platform 108. Examples of the control of the access of the host account include, but are not limited to: providing access to monetary compensation available from the air monitoring platform 108 based on the pollution event 1006, providing access to instrumentalities of the air monitoring platform 108 to initiate enforcement requests related to aerial pollutant damage of the property, enabling access to instrumentalities of the air monitoring platform 108 to include the air insights 132 or the pollution event 1006 in a review of the client account, and so forth.

Having discussed exemplary details of the techniques for air insight content generation and presentation, consider now some examples of procedures to illustrate additional aspects of the techniques.

Example Procedures

This section describes examples of procedures for air monitoring and air insight generation. In general, functionality, features, and concepts described in relation to the examples above and below may be employed in the context of the example procedures described in this document. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways.

Thus, individual functionality, features, and concepts described in relation to different example environments, devices, components, figures, and procedures herein may be used in any suitable combinations and are not limited to the particular combinations represented by the enumerated examples in this description.

In at least some implementations, the procedures are performed by at least one of the air monitoring application 126, the air monitoring platform 108, the computing device 106, or the air monitoring device 104.

FIG. 11 depicts a procedure 1100 in an example of an implementation in which a user interface 140 of a computing device 106 is configured to present air insight content 134 including one or more air insights 132.

Air monitoring data 114 produced by an air monitoring device 104 for air in an area 102 monitored by the air monitoring device is obtained (block 1102). By way of example, the sensor 112 and the sensor module 202 of the air monitoring device 104 produce the particulate measurements 116 of the air monitoring data 114, and the time tracker 118 of the air monitoring device 104 produces the time data 120 of the air monitoring data 114. In one or more implementations, the air monitoring data 114 is obtained by the air insight engine 128 of the air monitoring application 126.

The air monitoring data 114 is processed to generate one or more air insights 132 associated with the air in the area 102 monitored by the air monitoring device 104 (block 1104). By way of example, the air insight engine 128 processes the air monitoring data 114 to determine one or more air insights 132, e.g., about the area 102's air quality. The air insight engine 128 may be configured to determine a variety of air insights 132 based on the particulate measurements 116 of the air monitoring data 114, such as air quality insights 508 or pollutant insights 510.

The air insights 132 may include, by way of example and not limitation, a current air quality measurement, a threshold air quality measurement 1008, how a current air quality measurement compares to one or more other air quality measurements, how one or more air quality measurements compare to one or more other air quality measurements for a geographical area, whether the current air quality measurement is exceeds, is equal to, or is lesser to the threshold air quality measurement 1008, a trend of the air quality measurements over a time period (e.g., whether the air quality measurements are increasing in value, decreasing in value, or constant over the time period), a rate of change of the air quality measurements over a time period (e.g., how quickly the air quality measurements are increasing or decreasing in value over the time period), a variability of the air quality measurements over the time period, and how a variability of the air quality measurements at a first time period (e.g., a "current" time period) compares to a variability of the air quality measurements at one or more other time periods (e.g., one or more historical time periods), to name just a few.

As discussed throughout, the air insight engine 128 may not be limited to determining air insights 132 based solely on the particulate measurements 116 of the area 102. Instead, the air insight engine 128 may determine the air insights 132 further based on a variety of other data without departing from the spirit or scope of the described techniques. By way of example and not limitation, the air insight engine 128 may determine the air insight 132 based on data describing other contextual data 136, such as local weather, accidents, fires, and so forth.

The air insight content 134 is generated based on the one or more air insights 132, the air insight content 134 including the one or more air insights 132 (block 1106). By way of example, the content generation module 506 of the air monitoring application 126 is configured to generate the air insight content 134. In general, the air insight content 134 includes the air insights 132. As discussed throughout, the air insights 132 may be represented or otherwise conveyed by the air insight content 134 in various forms of content, such as visual content, audio content, sensory content (e.g., a vibration tone via a mobile device), or textual content.

A user interface 140 of a computing device 106 is configured to display the air insight content 134 including the one or more air insights 132 (block 1108). By way of example, the user interface configuration module 130 obtains the air insight 132 from the air insight engine 128. Then, based on the air insight 132, the user interface configuration module 130 configures a user interface 140 and thus produces the configured user interface 140 with a selected air insight content 134 generated by the content generation module 506, e.g., which is indicative of the obtained air insight 132. Notably, in one or more examples, the user interface configuration module 130 produces the configured user interface 140 in accordance with the configuration data 138. As discussed throughout, the configuration data 138 generally controls which air insights 132 are presented as air insight content 134 to a particular user at a given time and how those air insights 132 are presented, e.g., which one or more visual elements are incorporated into the configured user interface 140 based on the one or more determined air insights 132. The air monitoring application 126 causes the configured user interface 140 with the air insight content 134 including the air insight 132 to be displayed by computing device 106. Consider now the following discussion of a procedure in another example of generation of air insight content 134 including different air insights 132 over different periods of time.

FIG. 12 depicts a procedure 1200 in another example of an implementation in which a user interface 140 of a computing device 106 is configured to present air insight content 134 including different air insights 132 over different periods of time.

Air monitoring data 114 for air in an area 102 monitored by an air monitoring device 104 during a first time period is obtained (block 1202). In accordance with the principles discussed herein, the user interface configuration module 130 (e.g., via configuration data 138) maps air insights 132 to different elements of air insight content 134 (e.g., visual elements) and controls which air insights 132 are presented in a user interface 140 via the air insight content 134 at a given time and how the air insights 132 are presented in the user interface 140 using the different elements of the air insight content 134. By way of example, the user interface configuration module 130 obtains configuration data 138. As discussed throughout, the configuration data 138 generally controls which air insights 132 are presented to a particular user at a given time and how those air insights 132 are presented, e.g., which elements of the air insight content 134 are incorporated into the configured user interface 140 based on the one or more determined air insights 132.

The air monitoring data 114 is processed to generate one or more air insights 132 associated with the air in the area 102 monitored during the time period (block 1204). By way of example, the air insight engine 128 is configured to process the air monitoring data 114 and generates air insights 132, such as air quality insights 508 and pollutant insights 510, by processing the air monitoring data 114. Additionally, or alternatively, the air insights 132 are generated based on the contextual data 136, such as a local weather of the area 102.

Air insight content 134 is generated, the air insight content including the one or more air insights 132 associated with the air in the area 102 monitored during the time period (block 1206). By way of example, the content generation module 506 is configured to generate the air insight content 134 including at least one of the one or more air insights 132. Examples of the air insight content 134 include an air quality graph, a description of an air quality of the air in the area 102 at a particular time, and so forth.

The user interface 140 is configured to display the air insight content 134 having the one or more air insights 132 associated with the air in the area 102 monitored by the air monitoring device 104 during the time period (block 1208). The time period, for example, may correspond to air insights 132 obtained over the previous one second time period, ten-minute time period, one hour time period, the previous day, and so forth. The user interface configuration module 130 then produces the configured user interface 140 by selecting one or more of the air insights 132 and presenting air insight content 134 presenting the selected one or more air insights 132 associated with the air in the area monitored during the time period in the configured user interface 140.

Different air monitoring data 114 for the air in the area 102 monitored by the air monitoring device 104 during a different time period is obtained (block 1210). By way of example, the air insight engine 128 is configured to obtain air monitoring data 114 from the air monitoring device 104. In one or more implementations, the air insight engine 128 is configured to obtain the air monitoring data 114 in real-time. By way of example, the different time period may be one second subsequent to the time period of one second.

The different air monitoring data 114 is processed to generate one or more different air insights 132 associated with the air in the area 102 monitored by the air monitoring device 104 during the different time period (block 1212). By way of example, the air insight engine 128 is configured to process the air monitoring data 114 and generates air insights 132, such as air quality insights 508 and pollutant insights 510, by processing the air monitoring data 114.

Different air insight content is generated based at least in part on the one or more different air insights, the different air insight content including the one or more different air insights (block 1214). By way of example, the content generation module 506 is configured to generate the air insight content 134 including at least one of the one or more air insights 132. In one or more implementations, the air insight content 134 includes visual elements, text, and so forth, conveying or representing the one or more air insights 132.

The user interface 140 of the computing device is configured to display the different air insight content (block 1216). In one or more implementations, the user interface configuration module 130 produces the configured user interface 140 by selecting one or more of the air insights 132 and presenting air insight content 134 presenting the selected one or more air insights 132 associated with the air in the area 102 monitored during the subsequent time period in the configured user interface 140. By way of example, the example user interface 702 of the example 700 depicts different air insights 132 associated with the air in the area 102 for a subsequent time period to the time period of the example user interface 602 of the example 600.

Consider now the following discussion of a procedure in another example control of access of a user account based on air insight generation.

FIG. 13 depicts a procedure 1300 in another example of an implementation in which access of a user account is controlled based on a determination of a pollution event 1006.

A threshold air quality measurement 1008 representing a threshold air quality for a non-polluted air quality is generated (block 1302). By way of example, the pollution module 1002 is configured to generate or obtain the threshold air quality measurement 1008, wherein the threshold air quality measurement 1008 is representative of a threshold measurement for a non-polluted air quality. In one or more implementations, the threshold air quality measurement 1008 is generated based at least in part on contextual data 136, such as a geolocation of the area, an U.S. Air Quality Index (AQI) associated with the geolocation of the area, a season of the area, a weather of the area, a humidity of the area, a size of the area, and so forth. Additionally, or alternatively, the threshold air quality measurement 1008 is generated based on previous air monitoring data produced by the air monitoring device for the air in the area monitored. For instance, the threshold air quality measurement 1008 may be generated based on previous air monitoring data produced as part of a protocol to ascertain one or more baseline air quality measurements for the area monitored by the air monitoring device.

Additionally, or alternatively, the pollution module 1002 is configured to obtain the threshold air quality measurement 1008, such as an objectively healthy air quality measurement, such as an air quality measurement of '100 AQI', which is recognized by the United States as an objectively 'acceptable' or 'moderately healthy' air quality measurement; an air quality measurement exceeding '100 AQI' is recognized by the United States as an objectively 'unhealthy' air quality measurement.

Based on air monitoring data produced by an air monitoring device for air in an area monitored by the air monitoring device, an air quality measurement for the air in the area is obtained (block 1304). In one or more implementations, the pollution module 1002 is configured to obtain an air quality insight 508. An air quality insight 508 may convey an air quality for the air in the area 102 monitored, such as via an air quality measurement.

The air quality measurement for the air in the area exceeding the threshold air quality measurement 1008 is determined (block 1306). By way of example, the pollution module 1002 is configured to generate a pollution event 1006 based on a determination that the air quality measurement for the air in the area 102 exceeds the threshold air quality measurement 1008. In one or more examples, at least one of the air monitoring application 126, the air monitoring platform 108, or the air monitoring device 104 are configured to generate a pollution event 1006 based on a determination that the air quality measurement for the air in the area 102 exceeds the threshold air quality measurement 1008.

Based on the determination that the air quality measurement exceeds the threshold air quality measurement 1008, an air insight conveying a pollution event is generated (block 1308). As discussed above, by way of example, the pollution module 1002 is configured to generate a pollution event 1006 based on a determination that the air quality measurement for the air in the area 102 exceeds the threshold air quality measurement 1008.

Based on the air insight conveying the pollution event, access of a user account is controlled (block 1310). By way of example, the access controller 1004 of the air monitoring platform 108 is configured to control access of user accounts—such as host accounts of property that make the property available to client accounts via the air monitoring platform 108, client accounts that reserve the property made available by the host accounts for a time frame—to the air monitoring platform 108. Responsive to receiving the pollution event 1006 from the pollution module 1002, the access controller 1004 controls the access to the air monitoring platform for one or more user accounts affiliated with the area monitored.

By way of example, responsive to receiving a pollution event 1006 associated with a reservation of a property during a time frame, the access controller 1004 is configured to control access of a client account responsible for the property during the time frame. Examples of the control of the access of the client account include, but are not limited to: banning (e.g., stealth banning) the client account, preventing the client account from making future reservations of different property made available via the air monitoring platform 108, canceling future reservations of different property made available via the air monitoring platform 108, applying a penalty to the client account, restricting the presentation of different property made available via the air monitoring platform 108, and so forth. In one or more implementations, the control of the access by the access controller 1004 may be lifted or removed responsive to an indication of compensation from the client account to the host account for the damages associated with the reservation of the property during the time frame.

Additionally, or alternatively, responsive to receiving the pollution event 1006 associated with the reservation of the property during the time frame, the access controller 1004 is configured to control access of the host account that made the property available for reservation during the time frame via the air monitoring platform 108. Examples of the control of the access of the host account include, but are not limited to: providing access to monetary compensation available from the air monitoring platform 108 based on the pollution event 1006, providing access to instrumentalities of the air monitoring platform 108 to initiate enforcement requests related to aerial pollutant damage of the property, enabling access to instrumentalities of the air monitoring platform 108 to include the air insights 132 or the pollution event 1006 in a review of the client account, and so forth.

Having described examples of procedures in accordance with one or more implementations, consider now an example of a system and device that can be utilized to implement the various techniques described herein.

Example System and Device

FIG. 14 illustrates an example 1400 of a system that includes an example computing device 1402 that is representative of one or more computing systems and/or devices that may implement the various techniques described herein. This is illustrated through inclusion of the air monitoring platform 108 and the air monitoring application 126. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418, the resources 1418 including air monitoring platform 108. The platform 1416 abstracts underlying functionality of hardware (e.g., servers) and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system of the example 1400. For example, the functionality may be implemented in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by an air monitoring application, air monitoring data produced by an air monitoring device via a laser-scattering sensor for air in an area of a vehicle monitored by the air monitoring device during a time period associated with a reservation of the vehicle by a client account, in which the air monitoring data includes particulate measurements including size-binned particulate counts per unit volume, and time data including timestamps corresponding to the size-binned particulate counts per unit volume;

processing, by the air monitoring application, the air monitoring data to generate one or more air insights associated with the air in the area of the vehicle monitored during the time period, wherein the processing comprises:

classifying, based at least in part on the particulate measurements and the time data, one or more pollutant types present in the air in the area of the vehicle; and determining, for each of the one or more pollutant types classified, a metric including at least one of a concentration or a quantity during the time period;

generating, by the air monitoring application, air insight content including the one or more air insights associated with the air in the area of the vehicle monitored during the time period, in which the one or more air insights include one or more pollutant insights including identification of the one or more pollutant types classified and each corresponding metric; and configuring, by the air monitoring application, a user interface of a computing device to display the air insight content including the one or more air insights.

2. The method of claim 1, further comprising:

obtaining, by the air monitoring application, different air monitoring data for the air in the area of the vehicle monitored by the air monitoring device during a different time period;

processing, by the air monitoring application, the different air monitoring data to generate one or more different air insights associated with the air in the area of the vehicle monitored by the air monitoring device during the different time period;

generating, by the air monitoring application, different air insight content based at least in part on the one or more different air insights, the different air insight content including the one or more different air insights; and configuring, by the air monitoring application, the user interface of the computing device to display the different air insight content.

3. The method of claim 1, wherein the air insight content includes one or more visual elements representing the one or more air insights included in the air insight content.

4. The method of claim 1, wherein at least one of the one or more air insights is an air quality insight conveying an air quality of the air in the area of the vehicle during the time period.

5. The method of claim 1 wherein at least one of the one or more air insights is an air quality measurement associated with the air in the area of the vehicle during the time period.

6. The method of claim 1, wherein the processing of the air monitoring data to generate the one or more air insights further comprises:

generating a threshold air quality measurement representing a threshold air quality measurement for non-polluted air; and generating, based on the air monitoring data, an air quality measurement for the air in the area of the vehicle during the time period.

7. The method of claim 6, wherein the generating of the threshold air quality measurement is based at least in part on contextual data associated with the area of the vehicle during the time period.

8. The method of claim 6, wherein the generating of the threshold air quality measurement is based at least in part on previous air monitoring data for the air in the area of the vehicle during a previous time period.

9. The method of claim 6, wherein the processing further comprises:

determining that the air quality measurement for the air during the time period exceeds the threshold air quality measurement; and generating, based on the determining that the air quality measurement for the air in the area of the vehicle during the time period exceeds the threshold air quality measurement, an air insight conveying a polluted air quality.

10. The method of claim 6, wherein the processing further comprises:

determining that the air quality measurement for the air during the time period is equal to or lesser than the threshold air quality measurement; and generating, based on the determining that the air quality measurement for the air during the time period is equal to or lesser than the threshold air quality measurement, an air insight conveying a non-polluted air quality.

11. A non-transitory computer-readable storage medium encoding computer executable instructions that, when executed by a processing unit, perform operations comprising:

receiving air monitoring data produced by an air monitoring device using a laser-scattering sensor for air in an area of a vehicle monitored by the air monitoring device during a time period associated with a reservation of the vehicle by a client account via a vehicle access platform, in which the air monitoring data includes particulate measurements including size-binned particulate counts per unit volume, and time data including timestamps corresponding to the size-binned particulate counts per unit volume;

processing the air monitoring data to generate one or more air insights associated with the air in the area of the vehicle monitored during the time period;

generating air insight content based on the one or more air insights, the air insight content including the one or more air insights associated with the air in the area of the vehicle monitored during the time period; and controlling, based on the air insight content, access of the client account to the vehicle access platform.

12. The non-transitory computer-readable storage medium of claim 11, where in the processing of the air monitoring data further comprises generating, based on the air monitoring data, an air quality measurement for the air as an air insight.

13. The non-transitory computer-readable storage medium of claim 12, wherein the processing of the air monitoring data further comprises:

determining a threshold air quality measurement representing an air quality measurement for non-polluted air;

determining that the air quality measurement for the air exceeds the threshold air quality measurement; and generating, based on the determining, an air insight conveying a polluted air quality.

14. The non-transitory computer-readable storage medium of claim 11, further comprising:

receiving historical air monitoring data associated with the vehicle and contextual data associated with the vehicle;

generating a baseline air quality for the vehicle based on the historical air monitoring data;

generating, based on the contextual data and the baseline air quality for the vehicle, a contextual threshold air quality measurement representative of a non-polluted air quality for the area;

generating one or more air quality measurements by using the air monitoring data; and detecting, during the time period, a pollution event in which the one or more air quality measurements exceed the contextual threshold air quality measurement, and wherein the air insight content includes the pollution event detected.

15. The non-transitory computer-readable storage medium of claim 11, wherein the air insight content includes one or more visual elements representing the one or more air insights included in the air insight content.

16. The non-transitory computer-readable storage medium of claim 11, wherein the controlling of the access includes controlling, via the vehicle access platform, access by the client account to one or more areas of the vehicle.

17. An air monitoring system comprising:

an air insight engine implemented at least partially by hardware to:

receive air monitoring data produced by a laser-scattering sensor of an air monitoring device, the air monitoring data for air in an area monitored by the air monitoring device, in which the air monitoring data includes particulate measurements including size-binned particulate counts per unit volume, and time data including timestamps corresponding to the size-binned particulate counts per unit volume;

process the air monitoring data to generate one or more air insights associated with the air in the area monitored by the air monitoring device; and detect a pollution event based at least in part on the one or more air insights; and an access controller implemented at least partially by the hardware to control, responsive to the detecting of the pollution event, access to a vehicle access platform.

18. The air monitoring system of claim 17, wherein the air monitoring data includes a sensor identifier associated with the air monitoring device.

19. The air monitoring system of claim 17, wherein the air insight engine is implemented at least partially by the hardware to:

receive historical air monitoring data associated with the vehicle and contextual data associated with the vehicle;

generate a baseline air quality for the vehicle based on the historical air monitoring data; and generate, based on the contextual data and the baseline air quality for the vehicle, a contextual threshold air quality measurement representative of a non-polluted air quality for the area, and wherein the detecting of the pollution event is based at least in part on one or more air quality measurements included in the one or more air insights exceeding the contextual threshold air quality measurement.

20. The air monitoring system of claim 17, wherein the air monitoring data includes data describing one or more environmental conditions.

* * * * *